(12) United States Patent
Johnson et al.

(10) Patent No.: US 10,740,959 B2
(45) Date of Patent: Aug. 11, 2020

(54) TECHNIQUES FOR PROVIDING VIRTUAL LIGHT ADJUSTMENTS TO IMAGE DATA

(71) Applicant: Apple Inc., Cupertino, CA (US)

(72) Inventors: Garrett Johnson, San Francisco, CA (US); Chong Chen, Sunnyvale, CA (US); Frederic Cao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/032,418

(22) Filed: Jul. 11, 2018

(65) Prior Publication Data

US 2019/0080508 A1   Mar. 14, 2019

Related U.S. Application Data

(60) Provisional application No. 62/556,411, filed on Sep. 9, 2017.

(51) Int. Cl.
*G06T 15/50* (2011.01)
*G06K 9/00* (2006.01)
(Continued)

(52) U.S. Cl.
CPC .......... *G06T 15/50* (2013.01); *G06K 9/00234* (2013.01); *G06K 9/00268* (2013.01);
(Continued)

(58) Field of Classification Search
CPC ..................................................... G06T 15/50
See application file for complete search history.

(56) References Cited

U.S. PATENT DOCUMENTS

| | | | |
|---|---|---|---|
| 2006/0204034 A1* | 9/2006 | Steinberg | H04N 5/232 |
| | | | 382/103 |
| 2009/0247997 A1* | 10/2009 | Watanabe | A61F 9/008 |
| | | | 606/4 |

(Continued)

FOREIGN PATENT DOCUMENTS

| | | |
|---|---|---|
| CN | 106780359 | 5/2017 |
| JP | 2012178191 | 9/2012 |
| JP | 2013172166 | 9/2013 |

OTHER PUBLICATIONS

International Patent Application No. PCT/US2018/041792, "International Search Report and Written Opinion", dated Oct. 4, 2018, 13 pages.

*Primary Examiner* — Phi Hoang
(74) *Attorney, Agent, or Firm* — Blank Rome LLP

(57) ABSTRACT

Embodiments of the present disclosure can provide systems, methods, and computer-readable medium for providing virtual lighting adjustments to image data. A user interface for presenting and/or modifying image data may be provided via an electronic device. User input may be received that indicates a selection of a virtual lighting mode. Landmark points corresponding to a set of pixels of the image data may be identified based, at least in part, on depth measurement values of the set of pixels. One or more masks may be generated from the landmark points. One or more virtual lighting adjustments associated with the selected virtual lighting mode may be made to the image data using these masks (or the landmark points and an implied geometry of the landmark points). The adjusted/modified image may be presented to the user via the user interface at the electronic device.

25 Claims, 17 Drawing Sheets

(51) Int. Cl.
*H04N 5/232* (2006.01)
*G06K 9/46* (2006.01)
*G06T 5/00* (2006.01)
*G06T 5/20* (2006.01)

(52) U.S. Cl.
CPC ..... *G06K 9/00281* (2013.01); *G06K 9/00597* (2013.01); *G06K 9/4671* (2013.01); *G06T 5/002* (2013.01); *G06T 5/008* (2013.01); *G06T 5/20* (2013.01); *H04N 5/232933* (2018.08); *G06T 2207/10004* (2013.01); *G06T 2207/10028* (2013.01); *G06T 2207/30196* (2013.01)

(56) References Cited

U.S. PATENT DOCUMENTS

| | | | |
|---|---|---|---|
| 2011/0013829 A1 | 1/2011 | Kim | |
| 2011/0103655 A1* | 5/2011 | Young | G06T 7/33 |
| | | | 382/128 |
| 2014/0085398 A1* | 3/2014 | Tian | H04N 7/15 |
| | | | 348/14.01 |
| 2015/0086108 A1* | 3/2015 | Craig | G06F 21/32 |
| | | | 382/154 |
| 2018/0174586 A1* | 6/2018 | Zamora Esquivel | |
| | | | G06K 9/00248 |
| 2019/0122404 A1* | 4/2019 | Freeman | G06K 9/4652 |

\* cited by examiner

TECHNIQUES FOR PROVIDING VIRTUAL LIGHT ADJUSTMENTS TO IMAGE DATA

CROSS-REFERENCES TO RELATED APPLICATIONS

This application claims the benefit of U.S. Provisional Application No. 62/556,411 filed Sep. 9, 2017, the disclosure of which is incorporated by reference herein in its entirety.

BACKGROUND

It has become more common place for people to take photos during the course of their daily lives. Many personal devices (e.g., smartphones, wearable devices, tablets, etc.) now include a digital camera, making picture taking an easily accessible activity. Standalone digital cameras have continued to be popular. Social media has spurned an increased interest in sharing experiences through images as users often post photographs of themselves or loved ones to their social group. The digital cameras provided on most personal devices are not necessarily as robust as professional photography equipment. Additionally, some professional equipment may be bulky and difficult to transport. Although personal devices and standalone digital cameras may include many advanced features, the user may lack the experience or training to effectively utilize such features. Regardless of the medium used, it can often be the case that the image captured by a user lacks qualities found in professional photographs. To obtain professional quality photographs, one often must visit a studio or meet with a professional photographer. This can be inconvenient, or even cost-prohibitive, for many users.

SUMMARY

Embodiments of the present disclosure can provide systems, methods, and computer-readable medium for providing virtual lighting adjustments to image data (e.g., digital photos). In some examples, a computing device (e.g., a laptop, a mobile phone or other portable, handheld device) may be used to present user interfaces that enable the application of various virtual lights. The virtual lights may be used to modify the image data to produce a professional looking image without the cost or inconvenience of seeking out professional help.

In some embodiments, a computer-implemented method is disclosed for providing virtual light adjustments to image data. The method may comprise presenting, by an electronic device, a user interface for modifying image data. In some embodiments, the image data may include headshot image data. The method may further comprise receiving, at the user interface, user input indicating selection of a virtual lighting mode. It should be appreciated that the user input indicating the selection of the virtual lighting mode may be received prior to, or subsequent to image data being captured by an image capture device. The method may further comprise identifying a plurality of landmark points from the headshot image data. In some embodiments, each of the plurality of landmark points may correspond to a set of pixels of the headshot image data. The plurality of landmark points may individually be identified based at least in part on depth measurement values associated with the set of pixels. The method may further comprise determining one or more masks for the headshot image data. A mask of the one or more masks may correspond to a set of pixel locations of an area of the headshot image data. The one or more masks may be determined based at least in part on the plurality of landmark points. The method may further comprise modifying the headshot image data by applying a subset of a plurality of virtual lighting adjustments to the headshot image data according to at least one of the one or more masks. The headshot image data may be modified based at least in part on the selection of the virtual lighting mode selected and the depth measurement values associated with the set of pixels.

In some embodiments, a computer-implemented method is disclosed for providing virtual light adjustments to image data. The method may comprise presenting, by an electronic device, a user interface for modifying image data (e.g., either at capture time or later in post-processing). In some embodiments, the image data may include headshot image data. The method may further comprise receiving, at the user interface, user input indicating selection of a virtual contour lighting mode. The method may further comprise identifying a plurality of landmark points from the headshot image data. In some embodiments, each of the plurality of landmark points may correspond to a set of pixels of the headshot image data. The method may further comprise determining one or more masks for the headshot image data. In some embodiments, a mask may correspond to a set of pixel locations of an area of the headshot image data. The one or more masks may be determined based at least in part on the plurality of landmark points. The method may further comprise decreasing, according to the selection of the virtual contour lighting mode, the perceived illumination striking a first plurality of pixels associated with a side area of a first mask of the one or more masks. Decreasing the perceived illumination may cause the first plurality of pixels to appear darker, while still preserving skin-tone of the subject of the image data. The method may further comprise decreasing, according to the selection of the virtual contour lighting mode, luminance of a second plurality of pixels associated with a side of a nose area of a second mask of the one or more masks. The method may further comprise increasing, according to the selection of the virtual contour lighting mode, luminance of a third plurality of pixels associated with the nose area of the second mask of the one or more masks. The method may further comprise increasing, according to the selection of the virtual contour lighting mode, luminescence of a fourth plurality of pixels associated with a forehead area of a third mask of the one or more masks. The method may further comprise decreasing, according to the selection of the virtual contour lighting mode, luminance of a fifth plurality of pixels associated with the neck area of the headshot image data.

In some embodiments, a computer-implemented method is disclosed for providing virtual light adjustments to image data. The method may comprise presenting, by an electronic device, a user interface for modifying image data. In some embodiments, the image data including headshot image data. The method may further comprise receiving, at the user interface, user input indicating selection of a studio lighting mode. The method may further comprise identifying a plurality of landmark points from the headshot image data. In some embodiments, each of the plurality of landmark points may correspond to a set of pixels of the headshot image data. The method may further comprise determining one or more masks for the headshot image data. In some embodiments, these masks may correspond to a set of pixel locations of an area of the headshot image data. The masks may be determined based at least in part on the plurality of landmark points. The method may further comprise increasing, according to the selection of studio lighting mode, luminance of a first plurality of pixels associated with a forehead area of a first mask of the one or more masks. The method may further comprise increasing, according to the studio lighting mode selected, luminance of a second plurality of pixels associated with an under-eye area of a second mask of the one or more masks. The method may further comprise increasing, according to the studio lighting mode selected, luminance of a third plurality of pixels associated with a side area of a third mask of the one or more masks. The method may further comprise increasing, according to the studio lighting mode selected, luminance of a fourth plurality of pixels associated with nose area of a fourth mask of the one or more masks. The method may further comprise increasing, according to the studio lighting mode selected, luminance of a fifth plurality of pixels associated with a chin area of a fifth mask of the one or more masks. It should be appreciated that the masks described herein may be separate masks. Alternatively, a single mask may be utilized in lieu of any suitable combination of the masks described herein to increase/decrease luminance of any suitable combinations of pixels.

The following detailed description together with the accompanying drawings will provide a better understanding of the nature and advantages of the present disclosure.

DETAILED DESCRIPTION

Figure 1:
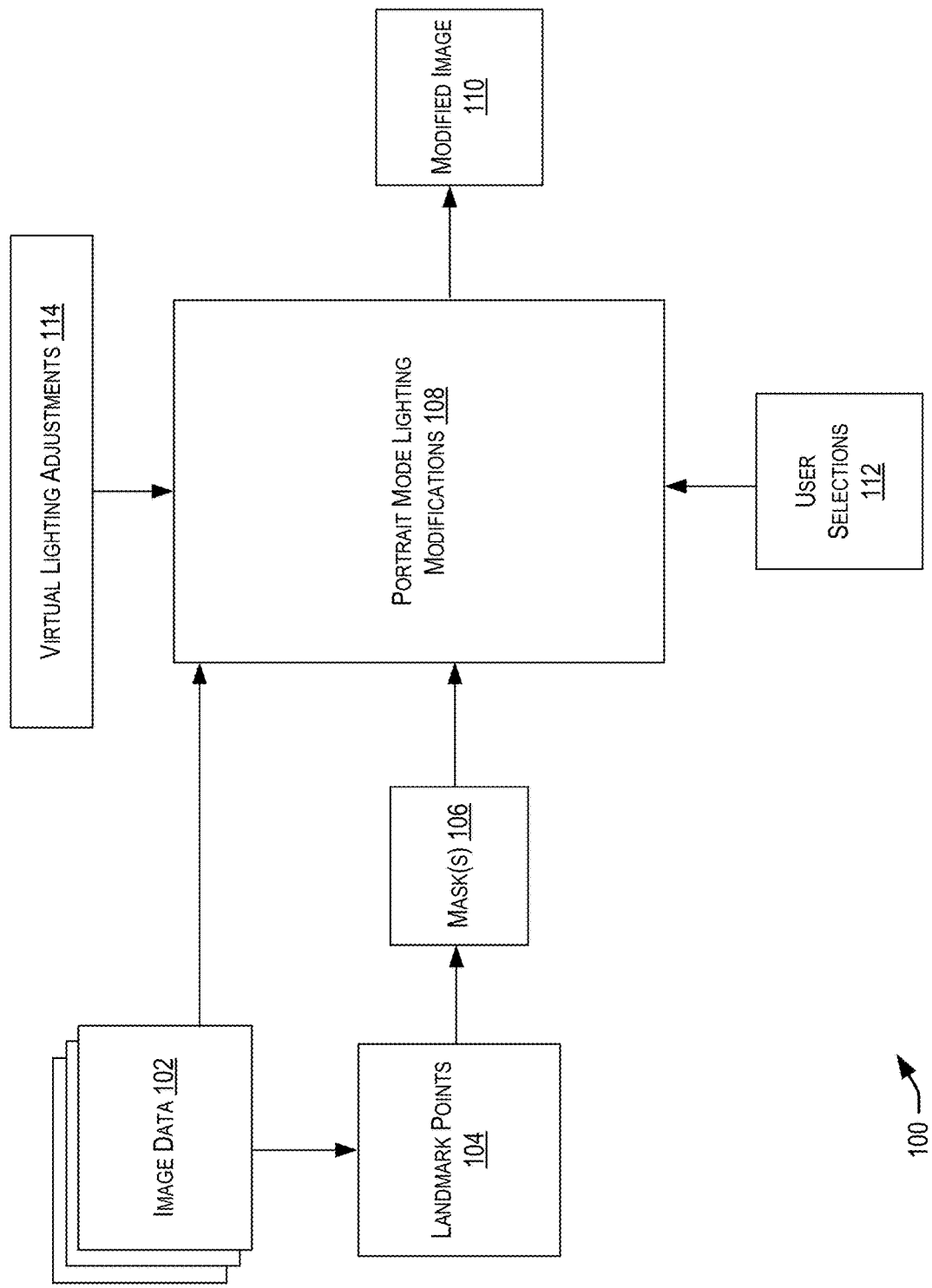
FIG. 1 is a simplified block diagram illustrating an example process for modifying image data to provide virtual lighting adjustments as described herein, according to at least one embodiment.

Certain embodiments of the present disclosure relate to devices, computer-readable medium, user interfaces, and methods for modifying image data to provide virtual lighting adjustments. "Image data" is intended to refer to any suitable information (e.g., RGB values, depth measurement values corresponding to depth maps, 2 Dimensional (2D) image data, 3-Dimensional (3D) image data, etc.) related to a digital image. In some examples, image data may include "headshot image data" that is related to a subject of the image, such as a portion of the image depicting a headshot (e.g., an area of the face and/or an area within some distance of the face such as the subject's neck, shoulders, chest, etc.) of the subject. Although examples herein may be provided in the context of digital images that include an image of a single subject (e.g., a person), it should be appreciated that digital images that include more than one subject may be similarly modified using the techniques described below.

Once an image is captured, the user may preview the image and select from a variety of lighting modes. In some embodiments, the user may select a lighting mode prior to capture time, such that an image captured may be modified in accordance with lighting mode previously selected. Each lighting mode may be used to increase or reduce the perceived luminance (e.g., brightness) of pixels within the image according to a predefined scheme. In other words, each lighting mode may be associated with particular areas (or an area) of the subject and a particular manner by which the luminance of the pixels within those area(s) are to be modified. Accordingly, an image may be modified according to a lighting mode so that some portions of the subject appear lightened and/or other portions appear darkened. It should be appreciated that any mention of adjusting the luminance and/or brightness of pixels may be equally applied to situations in which the luminance and/or brightness appears (may be perceived) to be adjusted, regardless of whether the luminance and/or brightness of the pixels is actually modified. By utilizing the techniques described herein, the user may modify an image at capture time to more closely resemble a professionally captured or edited digital image. Accordingly, the quality of a digital image may be improved without the necessity to confer with a professional photographer and/or purchase expensive photography equipment.

By way of example, a user may use a personal computing device with image capture functionality/hardware (e.g., a smartphone, wearable device, laptop, etc.) to capture an image. The captured image can include headshot image data corresponding to any suitable number of subjects within the image. A preview of the captured image can be displayed on a screen of the user's personal device. In some examples, a smoothing technique (e.g., a noise reduction algorithm) may be applied to the previewed image to reduce image noise produced during capture. In some embodiments, a "fill" light may be applied to the subject(s) in the image (e.g., the face(s) of the subject(s)) to smooth out shadows and uneven illumination. The skin-tone of the subject(s) may be maintained to provide lighting adjustments without washing out the image. This may have the effect of providing a more realistic modification that closely resembles lighting adjustments physically performed by a professional photographer. A user interface may be provided that allows the user to select one of the various lighting modes (e.g., contour, studio, stage, etc.) with which to modify the previewed image.

As discussed herein, a set of lighting modes may include a contour mode, a studio mode, and a stage mode. A contour mode may be utilized to produce a modified image that, at least in part, increases brightness toward the front of the face and darkens the side(s) of the face. A studio mode may be utilized to generally brighten the face and highlight the side(s) of the face. In examples in which a face isn't detect, the foreground of the image may be brightened in studio mode. A stage mode may at least depict the subject as emerging from a darkened background. In some examples, an additional stage mode (e.g., stage mode black and white) may be provided that depicts the subject in black and white and emerging from a darkened background. In either stage mode, the background of the image may be darkened (or blacked out), even if no facial features are detected. Any suitable combination of user interface elements may be provided and those interface elements may correspond to any suitable combination of the lighting modes described herein. It should be appreciated that the lighting modes described herein are illustrative in nature and that other modes that provide different lighting mode adjustments are contemplated.

Upon receiving user selection of a particular lighting mode, the image data may be analyzed to identify headshot image data (e.g., corresponding to an area within, and/or around, a subject's face). Landmark points may be used to identify particular locations/portions of the headshot image. Any suitable number of landmark points may be obtained using the image data (including the headshot image data) based at least in part on analyzing depth measurement values of the image data. A set of landmark points may define a particular area of the headshot. By way of example, one set of landmark points may define an outline of the subject's head, while another set of landmark points may define an area corresponding to the subject's eyebrow(s), mouth, eye(s), nose, teeth, or the like.

A number of masks (e.g., one or more) may be generated from the landmark points. These masks may be generated depending on the area of the image such that localized lighting modifications can be made to the image. At least one of these masks may be a 3D virtual model generated from 2D image data and depth measurement values of the image. In some examples, a mask may include an outline of the subject's head but exclude areas corresponding to the subject's eyes, eyebrows, nose, mouth, teeth, or the like. Accordingly, in some embodiments, a mask may define portions of the image within which the subject's skin is depicted (e.g., face, décolletage, shoulders, neck, or the like). In still further examples, a mask may define portions of the subject such as the forehead, chin, cheeks, nose, eyes, or any suitable portion of the subject. Generally, virtual light(s) may be directed to various portions of the mask(s) to determine how the application of the light may affect the appearance of skin within the image.

In some embodiments, a mask may be utilized to identify sets of pixel locations corresponding to sub-portions of the headshot. For example, the mask may be utilized to identify any suitable combination of a cheek/cheekbone area, a chin area, a forehead, sides of the face, temples, or any suitable portion of the subject of an image. Once identified, the image data corresponding to the sets of pixel locations may be modified in accordance with the lighting mode selected.

In some embodiments, depth measurement values of the image data may influence a degree by which the image is modified according to the lighting mode. A depth measurement value may quantify a distance of the surface of scene objects from a viewpoint. Depth measurement values can be used to determine the depths of various points of the face or other portions of the subject, as well as the depth of a subject within an image. In some cases, an image of a subject in the background (e.g., over some threshold depth value) of the image may be modified in a different manner than an image of a different subject in the foreground (e.g., under the threshold depth value) of the image. By way of example, a lighting mode may cause a foreground subject image to be modified with more extensive luminance changes that those applied to the background subject image. In some embodiments, a foreground subject image alone may be modified according to the lighting mode selection, while a background subject image is ignored because the background subject is determined to be oriented at a depth that is over a threshold depth value. By varying the effect of the lighting mode on the subject image based at least in part on depth, a more realistic image may be provided than if the lighting mode was universally applied to each subject image irrespective of the depth of the subject image.

In some embodiments, a face size and/or orientation of a face of the subject may be utilized to make lighting modifications. By way of example, a subject within the image may be facing at an angle within the image. Accordingly, the effect of the lighting mode on the subject may vary based at least in part on how the subject is orientated. That is, a side of the subject's face that appears to be facing away from the camera may be modified with a lesser amount of lighting modifications than the side of the subject's face that appears to be facing toward the camera.

The techniques described above are discussed in further detail below with respect to the following figures.

FIG. 1 is a simplified block diagram illustrating an example process 100 for modifying image data 102 to provide virtual lighting adjustments as described herein, according to at least one embodiment. It should be appreciated that virtual lighting adjustments may be made at image capture time, or at any suitable time subsequent to capturing or otherwise obtaining an image. For example, image data 102 may be collected at any suitable time. As a non-limiting example, image data 102 may correspond to any suitable number of digital images collected using an image capture device (e.g., a camera). In some embodiments, the image capture device may be part of a user's personal device (e.g., a smartphone). Image data 102 may correspond to respective images that individually depict one or more subjects (e.g., people). The image data 102 may include RGB values, depth measurement values corresponding to a depth map of an image, 2-Dimensional (2D) image data, 3-Dimensional (3D) image data, or any suitable combination thereof.

In some embodiments, depth measurement values (e.g., a depth map) of the image data 102 may be utilized to determine landmark points 104. By way of example, the depth measurement values may be used as input into a machine learning model. Although depth measurement values may be utilized in examples herein, it should be appreciated that in some embodiments, landmark points may be identified based at least in part on RGB image data. Thus, any example herein which may utilize depth measurement values for the purposes of illustration may additionally, or alternatively, be performed with RGB image data. In some embodiments, the machine learning model may be trained utilizing supervised machine learning techniques with images for which particular landmark points are known and identified. Once trained, the machine learning model may be configured to take depth measurement values as input and provide a set of landmark points as output.

The landmark points 104 may be used to generate one or more masks mask(s) 106 (e.g., one or more 3D virtual models, one or more implied geometries). For example, the landmark points 104 (or a subset of the landmark points 104) may be utilized to identify a variety of areas corresponding to a headshot of a subject of an image. As a non-limiting example, the landmark points 104 may provide an outline of an area of the headshot. Identified areas may include, but are not limited to, the areas of the face, neck, shoulders, décolletage, eye(s), eyebrow(s), nose, mouth, and teeth. In some embodiments, the mask(s) 106 may be generated to include individual area(s) (or combinations of areas) of the face but exclude the areas corresponding to the eye(s) nose, eyebrows, mouth, and teeth. According to some embodiments, the mask(s) 106 may define area(s) that depict skin within the headshot of the subject image. In some embodiments, lighting adjustments discussed herein may be made using the landmark points and an implied geometry of the landmark points without utilizing a mask at all.

The image data 102 may be modified according to a set of portrait mode lighting modifications 108 to produce a modified image 110. The portrait mode lighting modifications 108 may be determined based at least in part on a variety of factors. For example, a user selection 112 may specify a particular lighting mode (e.g., contour, studio, stage, black and white stage, etc.). The particular lighting mode selected may be used to identify the virtual lighting adjustments 114 to be performed on the image data 102 and/or the mask(s) 106. The virtual lighting adjustments 114 identified for the specified lighting mode may correspond to particular area(s) of a headshot for which luminance (and/or perceived luminance) is to be increased (e.g., lightened) or decreased (e.g., darkened). Virtual lighting adjustments 114 to the mask(s) 106 (or any suitable mask) may be converted and applied to the image data 102 at any suitable time.

In some embodiments, the image data 102 (e.g., depth measurement values) may further be utilized to determine a degree to which the portrait mode lighting modifications 108 alter the image data 102, or in other words, an amount by which the luminance of the areas of the headshot are modified. By way of example, pixels/areas of the headshot corresponding to shallow depth measurement values may be modified to a greater extent than pixels/areas corresponding to deeper depth measurement values. Accordingly, areas of the headshot that appear closer may be brightened more than areas of the headshot that appear further away. In some embodiments, the size of the face in the headshot and/or the orientation of the face within the headshot may be factored in when making lighting modifications. For example, the areas of the headshot that are facing away from the camera may be modified to a lesser extent than the areas of the headshot which are facing toward the camera. Similarly, in some embodiments, greater lighting modifications may be applied to larger faces than those applied to smaller faces.

As a specific non-limiting example, the user selection 112 may indicate that lighting mode "A" has been selected. Lighting mode A may be associated with virtual lighting adjustments 114. These virtual lighting adjustments 114 may specify that a forehead area of the image is to be brightened. As part of performing the portrait mode lighting modifications 108, the set of pixels associated with the forehead area may be identified from the image data 102 utilizing the mask(s) 106. Said another way, the forehead area may be determined within the mask(s) 106 and the pixels associated with that area may then be identified from the image data 102. The pixels corresponding to the forehead may then be brightened according to the virtual lighting adjustments 114. In some embodiments, the forehead may be brightened according to each pixel's respective depth measurement value. Thus, pixels depicting a portion of the forehead that appears closer may be brightened more than pixels depicting portions of the forehead that appear farther away. In some cases, the pixels corresponding to the forehead may be universally brightened according to the virtual lighting adjustments 114 regardless of each pixel's respective depth measurement value. In this example, once the portrait mode lighting modifications 108 are complete, the modified image 110 may depict the original image as defined by the image data 102 with a brightened forehead area.

Figure 2:
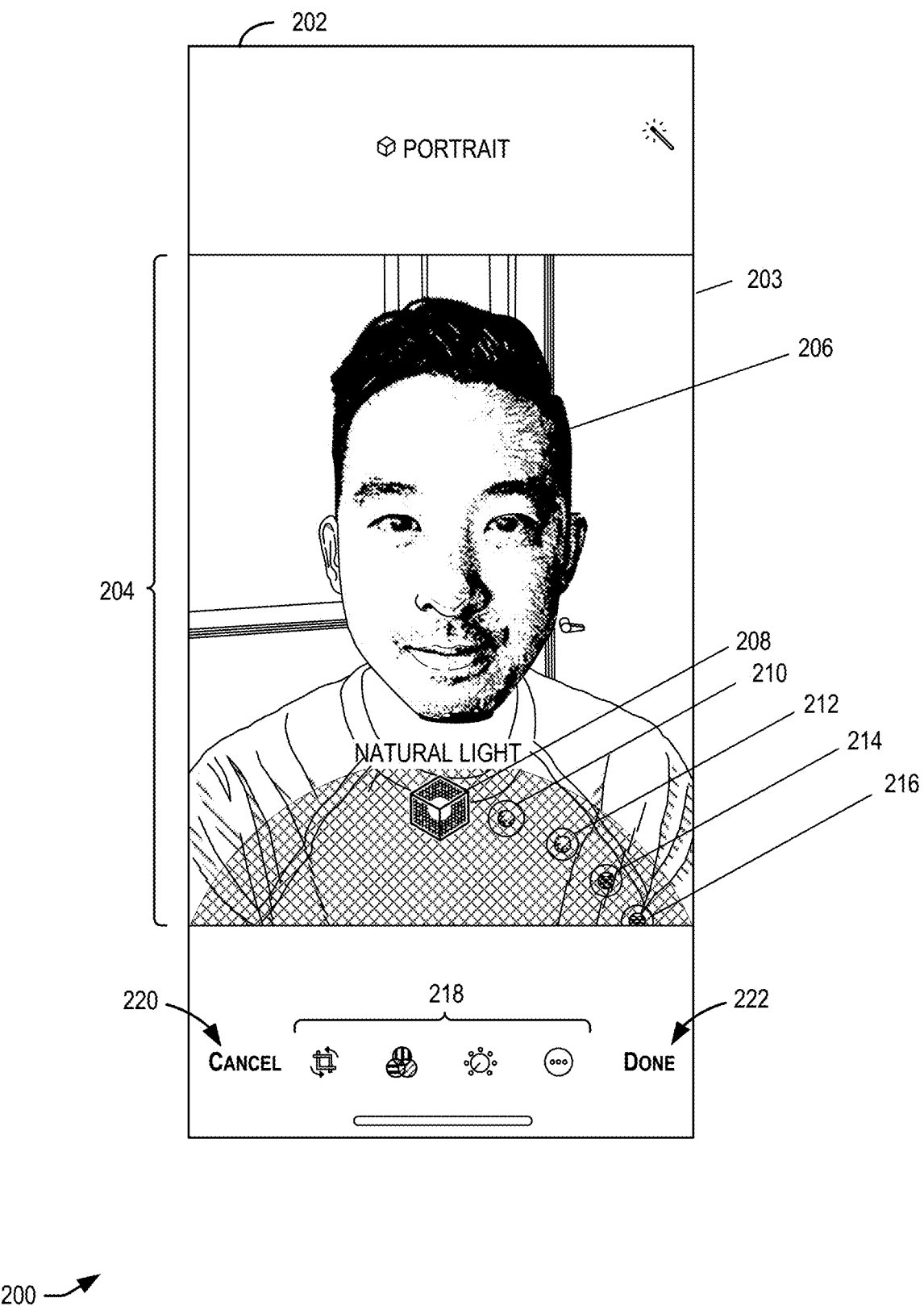
FIG. 2 is a simplified schematic diagram illustrating an example user interface for presenting and modifying image data, according to at least one embodiment.

FIG. 2 is a simplified schematic diagram illustrating an example user interface 200 for presenting and modifying image data (e.g., the image data 102 of FIG. 1), according to at least one embodiment. User interface 200 may be provided via a display 202. The display 202 may be a hardware component of a personal device (e.g., smartphone, mobile phone, wearable device, laptop, or the like). Within the user interface 200, a viewing area 204 is provided. The viewing area 204 may be configured to present an image 203 (e.g., an image including a subject 206). It should be appreciated that the image 203 is intended to be illustrative in nature and that any suitable image may be presented within the viewing area 204.

In some embodiments, a number of user interface (UI) elements may be provided. For example, UI element 208 may be provided. The UI element 208 may correspond to a natural light mode that corresponds to a view of the image 203 as captured by a capture device (e.g., a camera) of the personal device. UI element 210 may be provided and may correspond to an option for selecting a contour lighting mode. UI element 212 may be provided and may correspond to an option for selecting a studio lighting mode. UI element 214 may be provided and may correspond to an option for selecting a stage lighting mode. UI element 216 may be provided and may correspond to an option for selecting a black and white stage lighting mode. The UI elements 208-216 may be presented within the user interface 200 as depicted or the UI elements 208-216 may be depicted in a different arrangement within the user interface 200. The UI elements 208-216 may be presented with icons as depicted in FIG. 2, and/or the UI elements 208-216 may be provided in a menu, via checkboxes, radio buttons, or any suitable interface element suitable for providing a user the means of selecting a lighting mode. It should be appreciated that more or fewer lighting mode options may be provided then those depicted in FIG. 2.

Selection of any one of the UI elements 208-216 (e.g., lighting modes) may cause the image data of image 203 to be modified according to the selection. That is to say, that upon selection of a UI element, the image 203 as a whole and/or a portion of the image 203 (e.g., subject 206) may be modified according to the lighting mode corresponding to the selected UI element. A modified image (not depicted) may replace the image 203 in the viewing area 204. If the user were to select another UI element corresponding to a different lighting mode, the viewing area 204 may present a modified image corresponding to the image 203 as modified according to the newly selected lighting mode.

In some embodiments, the user interface 200 may include additional editing options 218. The additional editing options 218 may correspond to a variety of conventional image editing techniques such as, but not limited to, cropping an image, adjusting the colors (perceived or actual) within an image, and adjusting a contrast and/or brightness (perceived or actual contrast and/or brightness) of an image. The additional editing options 218 may be arranged as depicted in FIG. 2 although other arrangements are contemplated.

The user interface 200 may include a cancel option 220 and a done option 222. In some embodiments, selection of the cancel option 220 may cause a currently displayed image within the viewing area 204 to revert to an original state (e.g., the image 203 prior to the application of any editing and/or adjustments). Selection of the done option 222 may indicate that the user has completed his editing and/or adjustments. Upon selecting the done option 222 the image currently being presented within the viewing area 204 may be automatically saved or the user may be presented with an option to save the image.

Figure 3:
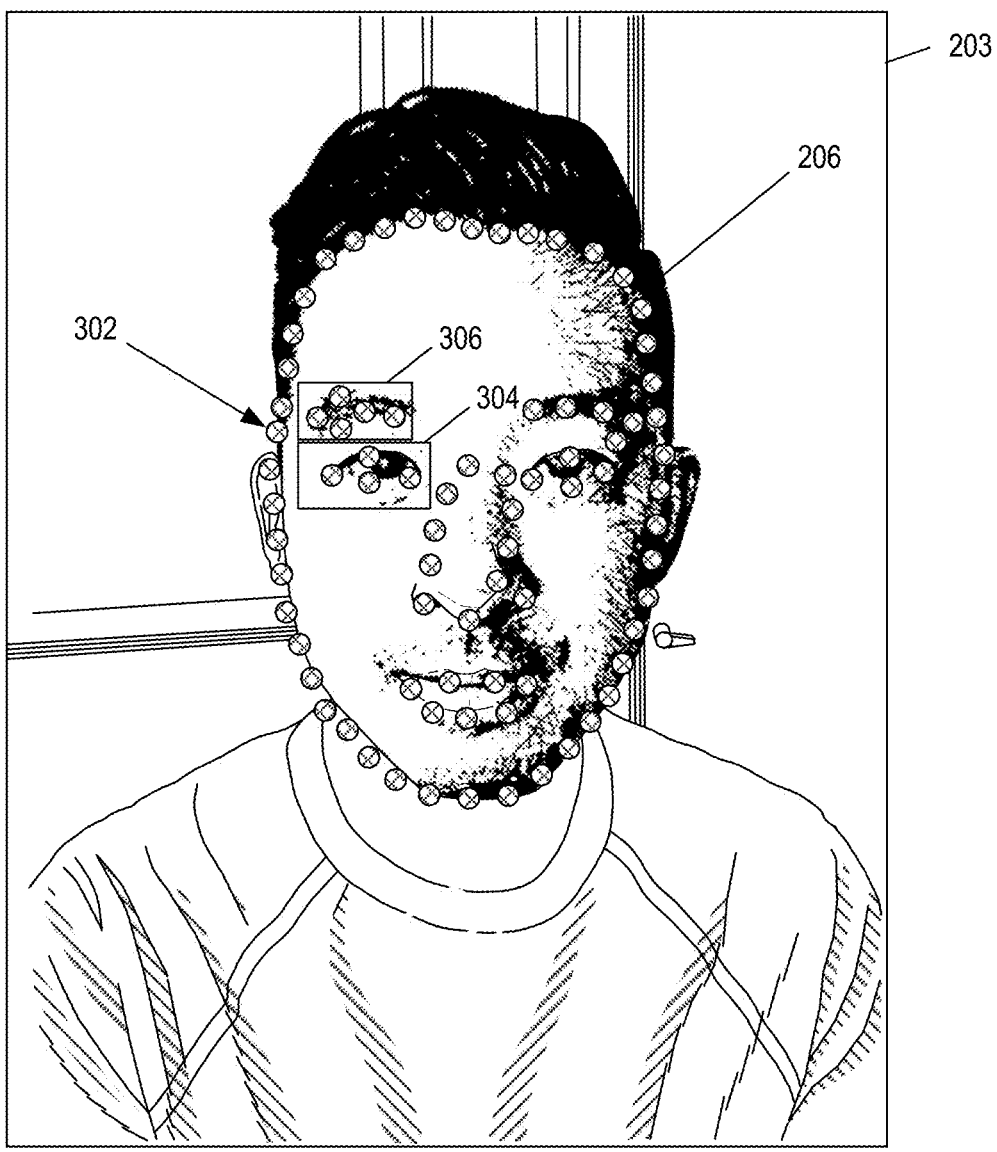
FIG. 3 is a simplified schematic diagram illustrating an example set of landmark points of an image, according to at least one embodiment.

FIG. 3 is a simplified schematic diagram 300 illustrating an example set of landmark points of an image (e.g., the image 203 of FIG. 2), according to at least one embodiment. The landmark point 302 is depicted as one of the set of landmark points of the image 203. Any description involving the landmark point 302 may similarly be applied to any of the landmark points depicted within FIG. 3. The landmark point 302 may be identified utilizing image data (e.g., image data 102 of FIG. 1 including depth measurement values corresponding to image pixels of the image 203). In some embodiments, any suitable number of depth measurement values may be utilized to determine the landmark point 302.

The number of landmark points depicted in FIG. 3 is intended to be illustrative in nature. Any suitable number of landmark points may be identified. In some embodiments, the landmark point 302 may be associated with a label or identifier. The label/identifier may be unique to the landmark point 302 or the label/identifier may be shared between the landmark point 302 and one or more additional landmark points. By way of example, the landmark points 304 may be identified and individually associated label/identifier associated with a left eye area of the subject 206. Similarly, the landmark points 306 may be identified and individually associated with label/identifier associated with a left eyebrow area of the subject 206. Landmark identification and labeling techniques will be described in further detail below with respect to FIG. 14.

Figure 4:
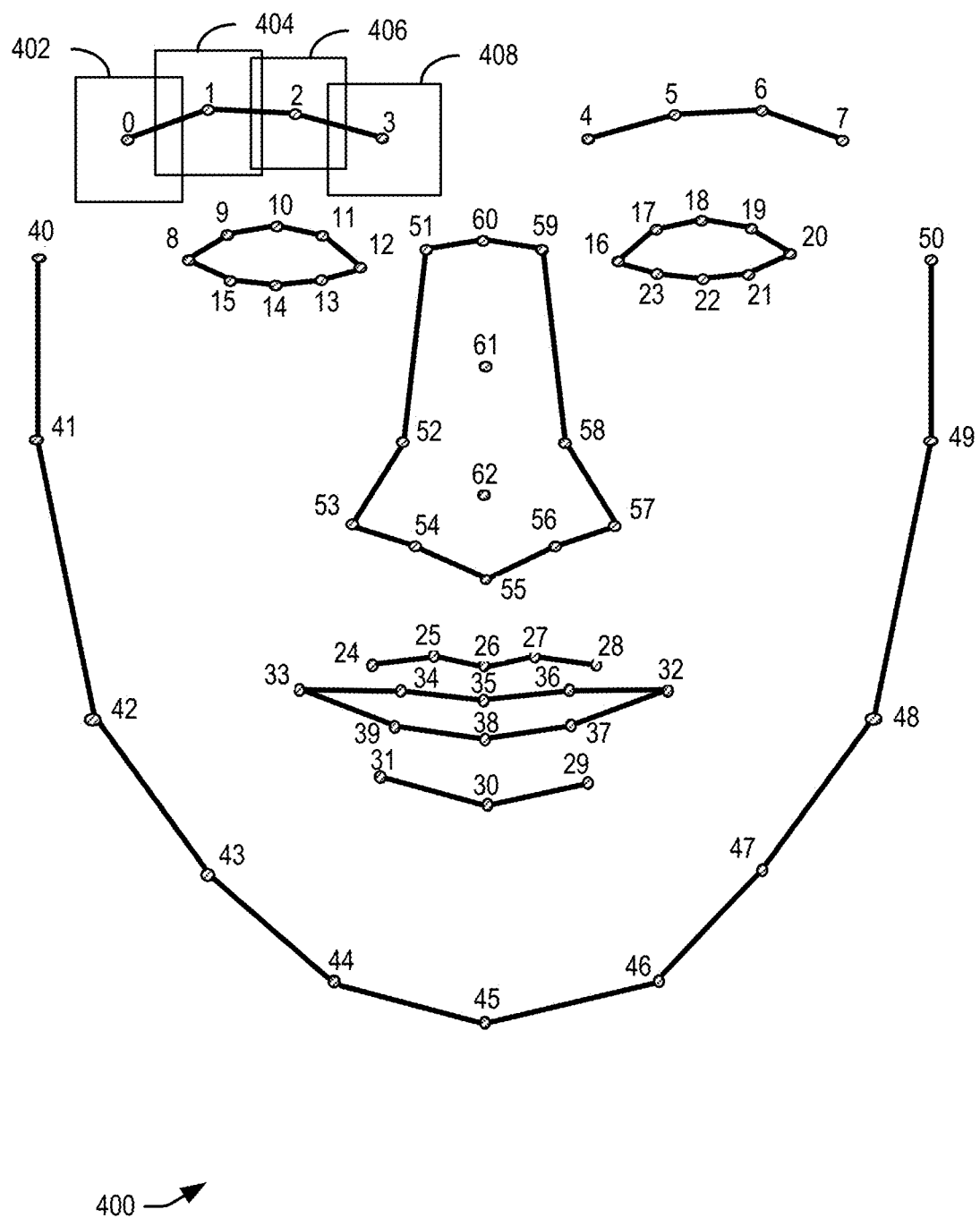
FIG. 4 is a simplified schematic diagram illustrating an example configuration of landmark points associated with an image, according to at least one embodiment.

FIG. 4 is a simplified schematic diagram illustrating an example configuration 400 of landmark points associated with an image, according to at least one embodiment. The configuration 400 includes 63 landmark points. However, any suitable number of landmark points may be utilized. Each landmark point (e.g., landmark points 0-63) may correspond to a pixel selected using image data (e.g., the image data 102 of FIG. 1). Each landmark point may be selected from any suitable number of pixels within a given area based at least in part on depth measurement values (and/or RGB values) of the pixels in the given area. By way of example, Landmark point 0 may be selected from pixels within area 402, landmark point 1 may be selected from pixels within area 404, landmark 2 may be selected from pixels within area 406, and landmark 3 may be selected from pixels within area 408. The area from which a landmark point is selected may vary in size and shape according to a predetermined scheme.

To select and/or identify a particular landmark from image data, depth measurement values (and/or RGB values) corresponding to each pixel within area 402 (or a set of pixels of an image such as image 203 of FIG. 2) may be provided as input to a machine learning model. The machine learning model may be trained (e.g., utilizing supervised learning techniques) with historical figures for which a landmark points are known. Accordingly, the machine learning model may be utilized to identify a single pixel (landmark point 0 corresponding to a left-most point of a left eyebrow) within area 402 that most closely resembles corresponding landmark points of historical images. Said another way, the machine learning model may utilize respective depth measurement values of the pixels within area 402 to identify a pixel (corresponding to the landmark point 0) is most likely to be the left-most point of a left eyebrow.

Each landmark point identified may be associated with a label or identifier corresponding to a particular landmark (e.g., a facial feature). As depicted in FIG. 4, landmark points 0-3 may be associated with a label/identifier indicating that landmark points 0-3 correspond to a left eyebrow. Similarly, landmark points 4-7 may be associated with a label/identifier indicating that the landmark points 4-7 correspond to a right eyebrow. Landmark points 8-15 may be associated label/identifier corresponding to a left eye, while landmark points 16-23 may be associated with a label/identifier corresponding to a right eye. Landmark points 24-31 may be associated or identified as corresponding to a mouth (or lips). Landmark points 32-39 may be labeled or identified as corresponding to teeth. Landmark points 40-50 may be labeled or identified as corresponding to an outline of the face. Landmark points 51-62 may be labeled or identified as corresponding to a nose.

Figure 5:
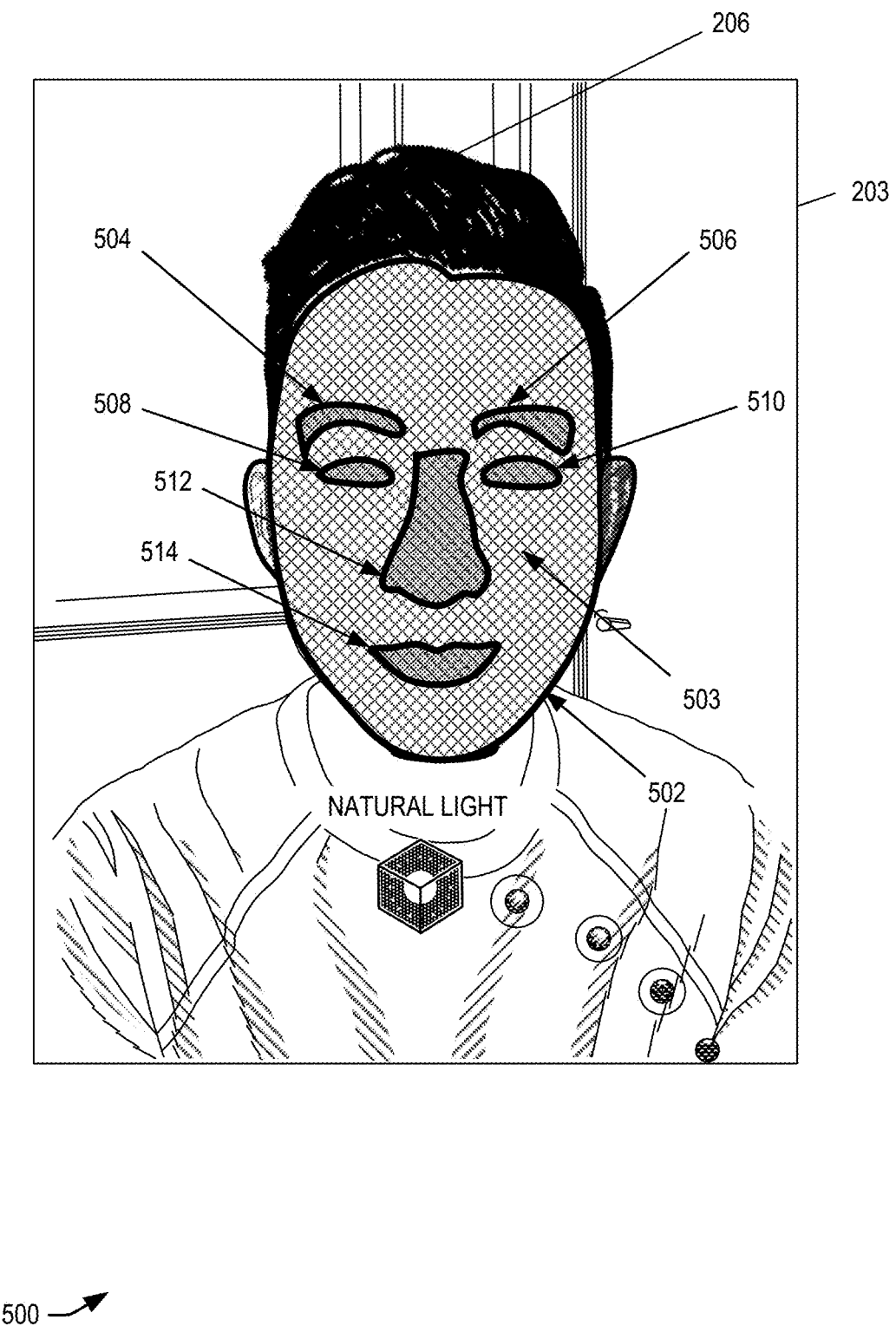
FIG. 5 is a simplified schematic diagram illustrating an example mask corresponding to an image, according to at least one embodiment.

FIG. 5 is a simplified schematic diagram 500 illustrating an example mask 502 corresponding to an image (e.g., the image 203 of FIG. 2), according to at least one embodiment. The mask 502 may be generated from the landmark points of FIG. 3 or FIG. 4. In some embodiments, the mask 502 may be utilized as described, while in other embodiments, the mask 502 may include one or more masks with which lighting adjustments may be made. For ease of illustration, the mask 502 may include a single mask, but it should be appreciated that the examples provided herein may similarly be applied to use cases in which multiple masks are utilized. Thus, any example that refers to "the mask 502" may be utilized synonymously as "a mask of one or more masks." A facial area 503 (including the face and ears of the subject 206) may be determined from a subset of the landmark points of FIG. 3. A left eye-brow area 504, right eye-brow area 506, left eye area 508, right eye area 510, nose area 512, and mouth area 514 may be determined from respective subsets of the landmark points depicted in FIG. 3. In at least one embodiment, the mask 502 may be generated by removing or excluding the areas 504-514 from the facial area 503. In some examples, the mask 502 may define an area within which subsequent virtual lighting adjustments are to be applied. Areas outside the mask 502 may be excluded from the application of a virtual lighting adjustment. Accordingly, the area defined by the mask 502 may correspond to a subset of pixels of the image 203. Further details of the mask will be described below in connection with FIG. 14.

Figure 6:
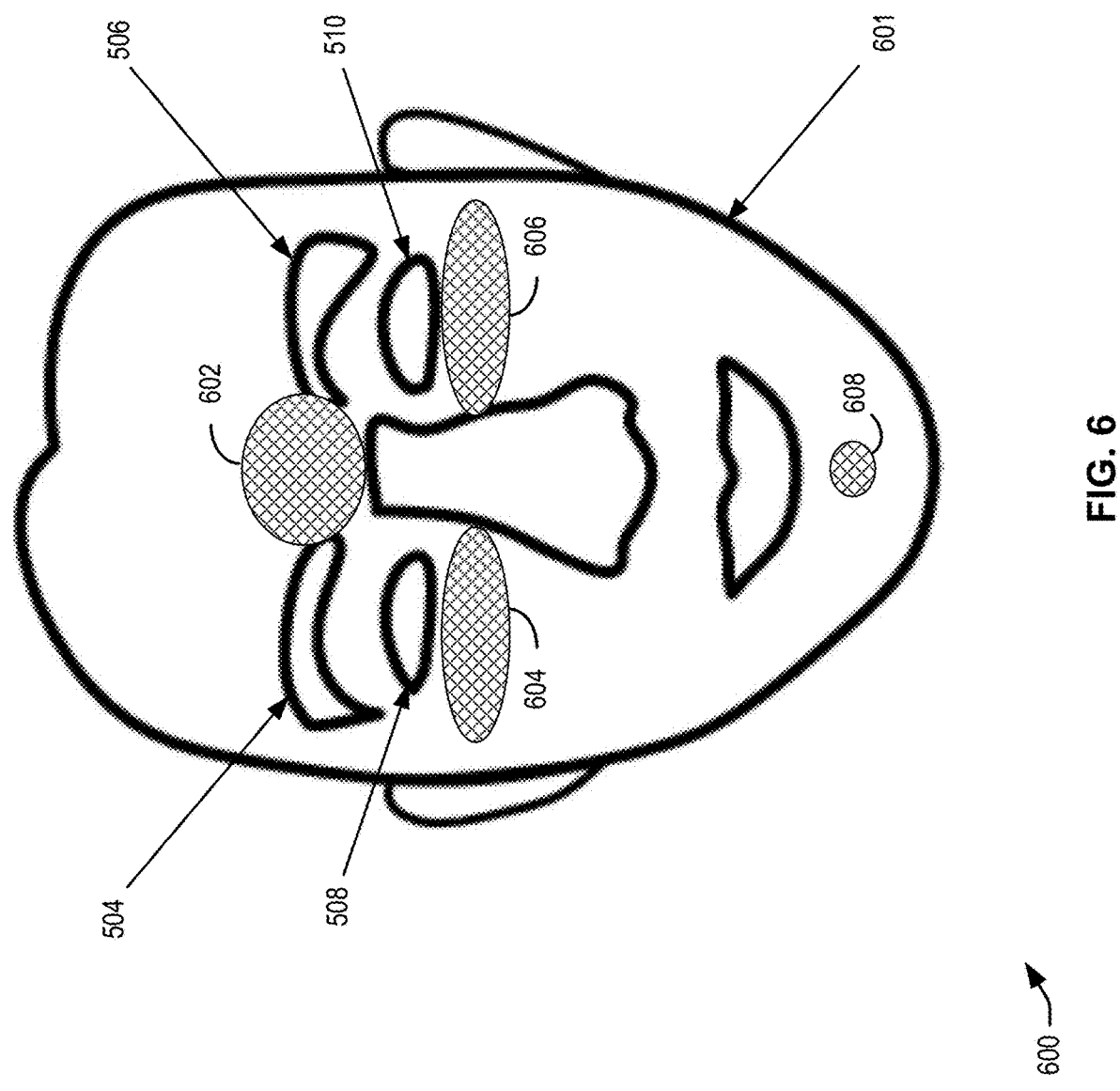
FIG. 6 is a simplified schematic diagram illustrating an example configuration of a set of lighting adjustment areas within a mask, according to at least one embodiment.

FIG. 6 is a simplified schematic diagram illustrating an example configuration 600 of a set of lighting adjustment areas within a mask 601 (e.g., the mask 502 of FIG. 5) It should be appreciated that the masks of FIGS. 6-10 may be the same as the mask 502 or a different mask and/or may or may not rely on the mask 502. In some embodiments, each type of lighting adjustment may utilize a different mask. In some embodiments, the mask 601 may not be utilized, but rather, lighting adjustments may be made using landmark points and an implied geometry of the landmark points. A lighting adjustment area may define a boundary within which a lighting adjustment is to be made. The lighting adjustment areas of FIG. 6 may include lighting adjustment area 602, lighting adjustment area 604, lighting adjustment area 606, and lighting adjustment area 608, although any suitable number or configuration of lighting adjustment areas may be utilized. The lighting adjustment areas 602-608 may individually, or collectively, be associated with a particular lighting mode (e.g., contour, studio, stage, black and white stage, etc.). The location and shape of the lighting adjustment areas 602-608 may be predefined. Although particular locations and shapes of the lighting adjustment areas 602-608 are provided in FIG. 6, it should be appreciated that such locations/shapes are merely illustrative in nature and other locations and/or shapes may be used.

In at least one embodiment, each of lighting adjustment areas 602-608 may be utilized to apply lighting adjustments to simulate a corresponding virtual spotlight. A virtual spotlight lighting adjustment may be utilized to simulate the visual effect of using a physical light to project a beam of light directed to a particular location/area of a subject. In some embodiments, each of the lighting adjustment areas 602-608 may correspond to a unique virtual spotlight, or a combination of the lighting adjustment areas 602-608 may correspond to a single virtual spotlight. For ease of explanation, the lighting adjustment areas 602-608 may be considered to be corresponding to a single virtual spotlight that simulates multiple beams of physical lights or a simulated large area light source (that simulates a portrait photographers "soft box") which may light the entire face.

In at least one embodiment, the lighting adjustment areas 602-608 may be defined in relation to the mask 601. By way of example, the lighting adjustment area 602 may be predefined as corresponding to an area of the mask 601 (or an area defined by landmark points and an implied geometry) between the left eye-brow area 504 and the right eye-brow area 506. The location, size, shape, and/or orientation of the lighting adjustment area 602 may be as depicted in FIG. 6, or the location, size, shape, and/or orientation of the lighting adjustment area 602 may differ from that depicted in FIG. 6.

The lighting adjustment area 604 may be predefined as corresponding to an area of the mask 601 (or an area defined by landmark points and an implied geometry) under the left eye area 508. The lighting adjustment area 606 may be predefined as corresponding to an area of the mask 601 (or an area defined by landmark points and an implied geometry) under the right eye area 510. The location, size, shape, and/or orientation of the lighting adjustment area 604 and/or the lighting adjustment area 606 may be as depicted in FIG. 6, or the location, size, shape, and/or orientation of such areas may differ from those depicted in FIG. 6.

The lighting adjustment area 608 may be predefined as corresponding to a chin area of the mask 601 (or an area defined by landmark points and an implied geometry). In some examples, the chin area may defined as an area between two landmark points. For example, a midway distance between landmark point 30 and landmark point 45 of FIG. 4 may be calculated and associated with a chin area of the mask 601 (or an area defined by landmark points and an implied geometry). The location, size, shape, and/or orientation of the lighting adjustment area 608 may be as depicted in FIG. 6, or the location, size, shape, and/or orientation of the lighting adjustment area 608 may differ from that depicted in FIG. 6.

Once identified, the lighting adjustment areas 602-608 of the mask 601 (or an area defined by landmark points and an implied geometry) may be utilized to identify corresponding sets of pixels of an image (e.g., the image 203 of FIG. 2). Various virtual lighting adjustments may be applied to the corresponding sets of pixels. In some embodiments, the same virtual lighting adjustment may be applied universally to the lighting adjustment areas 602-608 or the virtual lighting adjustment may differ between the lighting adjustment areas 602-608. By way of example, the application of a universally applied virtual lighting adjustment may cause respective brightness values of each of the pixels to the lighting adjustment areas 602-608 to be brightened by a particular amount (e.g., a 10% increase of each respective pixel's original brightness value, each brightness value may be increased by a common whole number value, etc.). In some cases, a pixel's original brightness may control an amount of light added, such that images in the shade may get more/less light added to them than images in direct light.

In some embodiments, image data (e.g., depth measurements values) of the pixels corresponding to the mask 601 (or the landmark points) may be utilized to determine a tilt, rotation, and/or subject of the image. In some examples, lighting adjustment performed utilizing the lighting adjustment areas 602-608 may be dependent on how the subject is tilted, rotated, or oriented. As a non-limiting example, when the subject's head is determined to be rotated, the adjusting that increase brightness of pixels corresponding to the lighting adjustment area 604 may be increased to a lesser degree than pixels corresponding to the lighting adjustment area 606. This may be case because the lighting adjustment area 604 may correspond to a portion of the subject that appears to be farther back than a portion of the subject corresponding to the lighting adjustment area 604.

Figure 7:
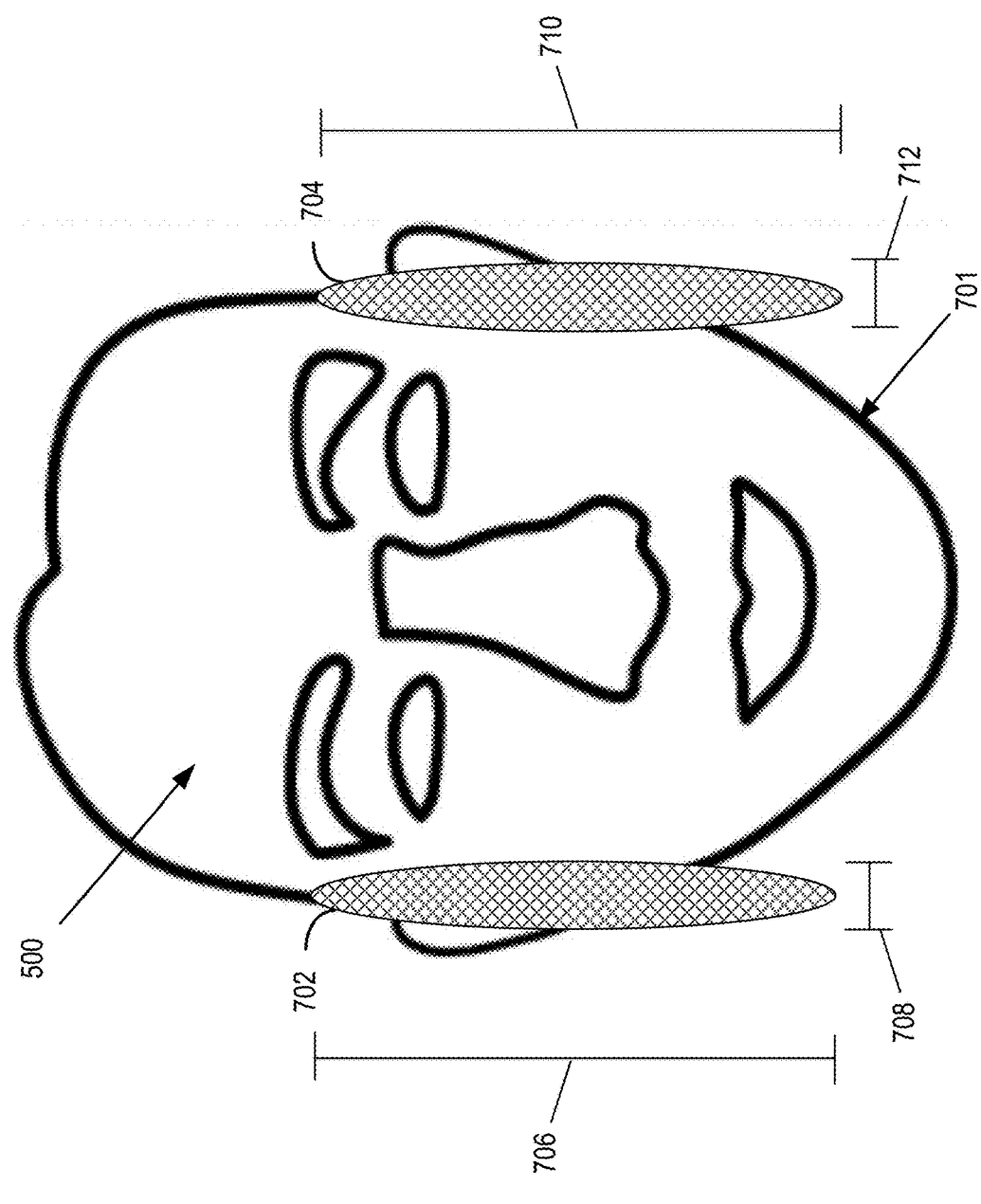
FIG. 7 is a simplified schematic diagram illustrating another example configuration of another set of lighting adjustment areas within a mask, according to at least one embodiment.

FIG. 7 is a simplified schematic diagram illustrating another example configuration 700 of another set of lighting adjustment areas within a mask 701 (e.g., the mask 502 of FIG. 5, the mask 601 of FIG. 6, or a different mask), according to at least one embodiment. In some embodiments, the mask 701 may not be utilized, but rather, lighting adjustments may be made using landmark points and an implied geometry of the landmark points. The lighting adjustment areas of FIG. 7 may include lighting adjustment area 702 and lighting adjustment area 704, although any suitable number or configuration of lighting adjustment areas may be utilized. The lighting adjustment areas 702-704 may individually, or collectively, be associated with a particular lighting mode (e.g., contour, studio, stage, black and white stage, etc.). The location, width, height, and shape of the lighting adjustment areas 702-704 may be predefined.

Although particular locations, widths, heights, and shapes of the lighting adjustment areas 702-704 are provided in FIG. 7, it should be appreciated that these attributes of the lighting adjustment areas 702-704 are merely illustrative in nature.

In at least one embodiment, each of lighting adjustment areas 702-704 may be utilized to apply lighting adjustments to simulate a corresponding virtual kick light. A virtual kick light lighting adjustment may be utilized to simulate the visual effect of shining a physical light at an angle directed to a side portion of a face, which may visually accent and/or deemphasize the side portion of the face. Similarly, some combination of the lighting adjustment areas 702-704 may be utilized to apply lighting adjustments directed to virtual light removal. Performing virtual light removal techniques utilizing the lighting adjustment areas 702-704 may darken a side portion of an object (e.g., a face) which may cause the side portion to be deemphasized, as if the subject were surrounded by a dark cloth.

In at least one embodiment, the lighting adjustment areas 702-704 may be defined in relation to the mask 701 or in relation to an area defined by landmark points and an implied geometry of the landmark points. By way of example, the lighting adjustment area 702 may be predefined as corresponding to an area corresponding to a left side of the mask 502. The lighting adjustment area 702 may be associated with a height 706 and a width 708. The height 706 and/or width 708 may be predefined, or the height 706 and/or width 708 may be calculated based at least in part on depth measurements values of pixels corresponding the lighting adjustment area 702. The location, size, shape, and/or orientation of the lighting adjustment area 702 may be as depicted in FIG. 7, or the location, size, shape, and/or orientation of the lighting adjustment area 702 may differ from that depicted in FIG. 7. In some embodiments, the location, shape, height 706, or width 708 of lighting adjustment area 702 may be calculated based at least in part on a tilt, rotation, and/or orientation of the subject as ascertained from the mask 701 and/or landmark points and an implied geometry.

As another example, the lighting adjustment area 704 may be predefined as corresponding to an area corresponding to a right side of the subject. The lighting adjustment area 704 may be associated with a height 710 and a width 712. The height 710 and/or width 712 may be predefined, or the height 710 and/or width 712 may be calculated based at least in part on depth measurements values of pixels corresponding to the lighting adjustment area 704. The location, size, shape, and/or orientation of the lighting adjustment area 704 may be as depicted in FIG. 7, or the location, size, shape, and/or orientation of the lighting adjustment area 704 may differ from that depicted in FIG. 7.

In some embodiments, image data (e.g., depth measurements values) of the pixels corresponding to the mask 701, or a number of landmark points and an implied geometric of the landmark points, may be utilized to determine a tilt, rotation, and/or orientation of the subject. In some examples, the lighting adjustment areas 702-704 may be determined based at least in part on how the subject is tilted, rotated, or oriented. By way of example, the width 708 of lighting adjustment area 702 may be smaller than the width 712 of the lighting adjustment area 704 when the subject is determined to be rotated in a given direction. Accordingly, the width 708 of the lighting adjustment area 702 corresponding to the side of the face that is rotated away may be narrower than the width 712 of the lighting adjustment area 704 corresponding to the side of face that is closer to the image capture device when the image was captured.

Once identified, the lighting adjustment areas 702-704 (e.g., as defined by the mask 701 or as defined by a set of landmark points and an implied geometry of the landmark points) may be utilized to identify corresponding sets of pixels of an image (e.g., the image 203 of FIG. 2). Various virtual lighting adjustments (e.g., brightening and/or darkening) may be applied to the corresponding sets of pixels. In some embodiments, the same virtual lighting adjustment may be applied universally to the lighting adjustment areas 702-704 or the virtual lighting adjustment may differ between the lighting adjustment areas 702-704. By way of example, the application of a universally applied virtual lighting adjustment may cause respective brightness values of each of the pixels to the lighting adjustment areas 702-704 to be brightened by a particular amount (e.g., a 10% increase of each respective pixel's original brightness value, each brightness value may be increased by a common whole number value, etc.). In another example, a virtual lighting adjustment may brighten one of the lighting adjustment areas 702-704 while another virtual lighting adjustment may darken the other. In still further examples, a virtual lighting adjustment may brighten or darken both the lighting adjustment areas 702-704 but by differing amounts.

Figure 8:
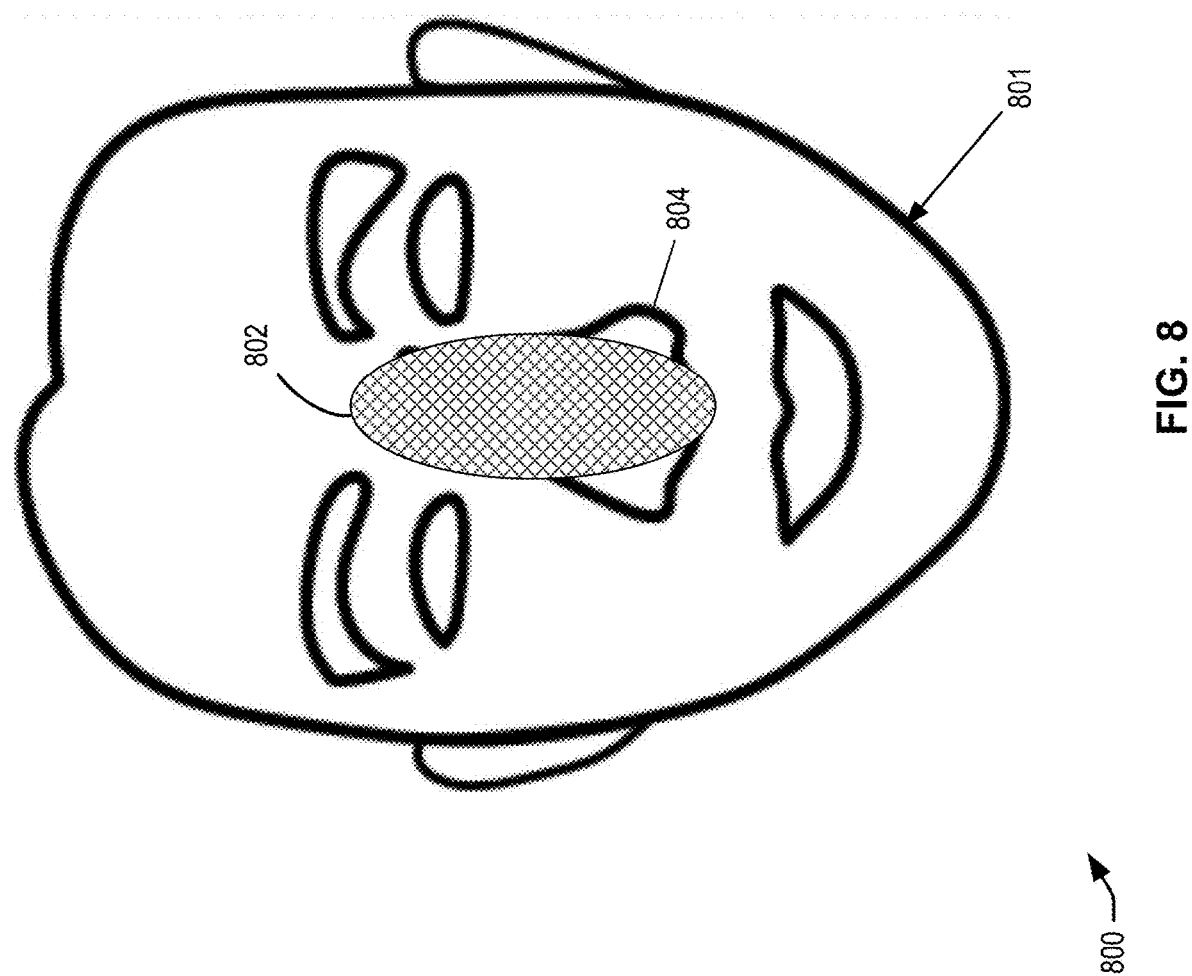
FIG. 8 is a simplified schematic diagram illustrating yet another lighting adjustment area, according to at least one embodiment.

FIG. 8 is a simplified schematic diagram 800 illustrating yet another lighting adjustment area (e.g., the lighting adjustment area 802), according to at least one embodiment. The lighting adjustment area 802 may be associated with a particular lighting mode (e.g., contour, studio, stage, black and white stage, etc.). The location and shape of the lighting adjustment area 802 may be predefined. Although a particular location and shape of the lighting adjustment area 802 is provided in FIG. 8, it should be appreciated that the attributes of the lighting adjustment area 802 are merely illustrative in nature. The lighting area 802 may be defined with respect to the mask 801 (e.g., the mask 502, the mask 601, the mask 701 of FIG. 5-7), while in other embodiments the mask 801 may not be utilized. In some embodiments, lighting adjustments may be made using landmark points and an implied geometry of the landmark points without utilizing a mask at all.

In at least one embodiment, the lighting adjustment area 802 may be utilized to apply lighting adjustments to simulate a virtual strobe light. A virtual strobe light lighting adjustment may be utilized to simulate the visual effect of shining a physical strobe light directed to a particular area of a subject. In at least one embodiment, the lighting adjustment area 802 may be predefined as corresponding to a nose area 804 (e.g., defined by a portion of the mask 501, an area defined by landmark points 51-62 of FIG. 4, etc.) of a subject of an image (e.g., the subject 206 of the image 203 of FIG. 2). In at least one example, application of a virtual strobe light lighting adjustment may cause the bridge of a nose to be brightened, although the virtual strobe light lighting adjustment may similarly be applied other areas of an image.

In some embodiments, image data (e.g., depth measurements values) of the pixels corresponding to the nose area 804 may be utilized to determine a tilt, rotation, and/or orientation of a portion of the subject (e.g., a portion corresponding to the nose area 804). Accordingly, the portions of the lighting adjustment area 802 that have deeper depth measurement values may be brightened at least some amount less than portions of the lighting adjustment area 802 that have shallower depth measurement values.

Once identified, the lighting adjustment areas 802 may be utilized to identify a set of pixels of an image (e.g., the image 203 of FIG. 2). The brightness values of the set of pixels may then be modified according to a predetermined scheme and, in some cases, the tilt, rotation, and/or orientation of subject and/or the nose area 804 as described above.

Figure 9:
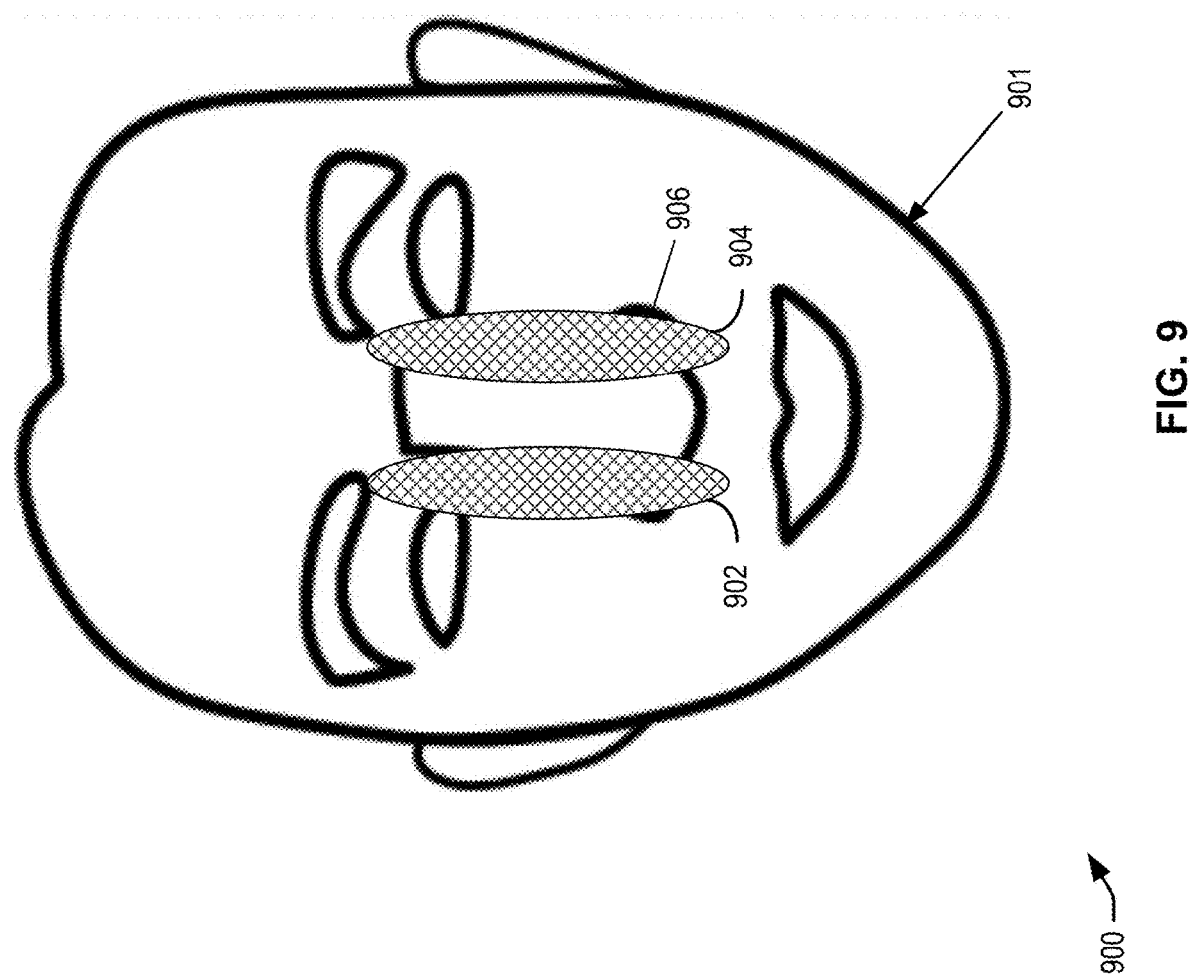
FIG. 9 is a simplified schematic diagram illustrating additional lighting adjustment areas for performing virtual light removal, according to at least one embodiment.

FIG. 9 is a simplified schematic diagram 900 illustrating additional lighting adjustment areas (e.g., the lighting adjustment area 902 and the lighting adjustment area 904) for performing virtual light removal, according to at least one embodiment. The lighting adjustment areas 902-904 may be associated with a particular lighting mode (e.g., contour, studio, stage, black and white stage, etc.). The location and shape of the lighting adjustment areas 902-904 may be predefined. Although particular locations and shapes of the lighting adjustment areas 902-904 are provided in FIG. 9, it should be appreciated that the attributes of the lighting adjustment areas 902-904 are merely illustrative in nature. The lighting areas 902-904 may be defined with respect to the mask 901 (e.g., the mask 502, the mask 601, the mask 701, the mask 801 of FIG. 5-8), while in other embodiments the mask 901 may not be utilized. In some embodiments, lighting adjustments may be made using landmark points and an implied geometry of the landmark points without utilizing a mask at all.

In at least one embodiment, the lighting adjustment areas 902-904 may individually, or collective, be utilized to apply lighting adjustments to darken a portion of a subject. Performing lighting adjustments that darken a portion of the subject may be referred to as virtual light removal. In at least one embodiment, the lighting adjustment areas 902-904 may be predefined as including side portions of a nose area 906 (e.g., an area defined with the mask 901, a nose area defined by landmark points 51-62 of FIG. 4, etc.) or any suitable portions of the subject of an image (e.g., the subject 206 of the image 203 of FIG. 2). In at least one example, virtual light removal may cause the sides of a nose to be darkened with respect to the original image.

In some embodiments, image data (e.g., depth measurements values) of the pixels corresponding to side portions of the nose area 906 may be utilized to determine a tilt, rotation, and/or orientation of the nose area 906. Accordingly, the portions of the lighting adjustment areas 902-904 that have deeper depth measurement values may have more light removed than portions of the lighting adjustment areas 902-904 that have shallower depth measurement values.

Once identified, the lighting adjustment areas 902-904 may be utilized to identify a set of pixels of an image (e.g., the image 203 of FIG. 2). The brightness values of the set of pixels may then be modified to darken at least some of the pixels according to a predetermined scheme and, in some cases, according to the tilt, rotation, and/or orientation of the nose area 906 as described above.

Figure 10:
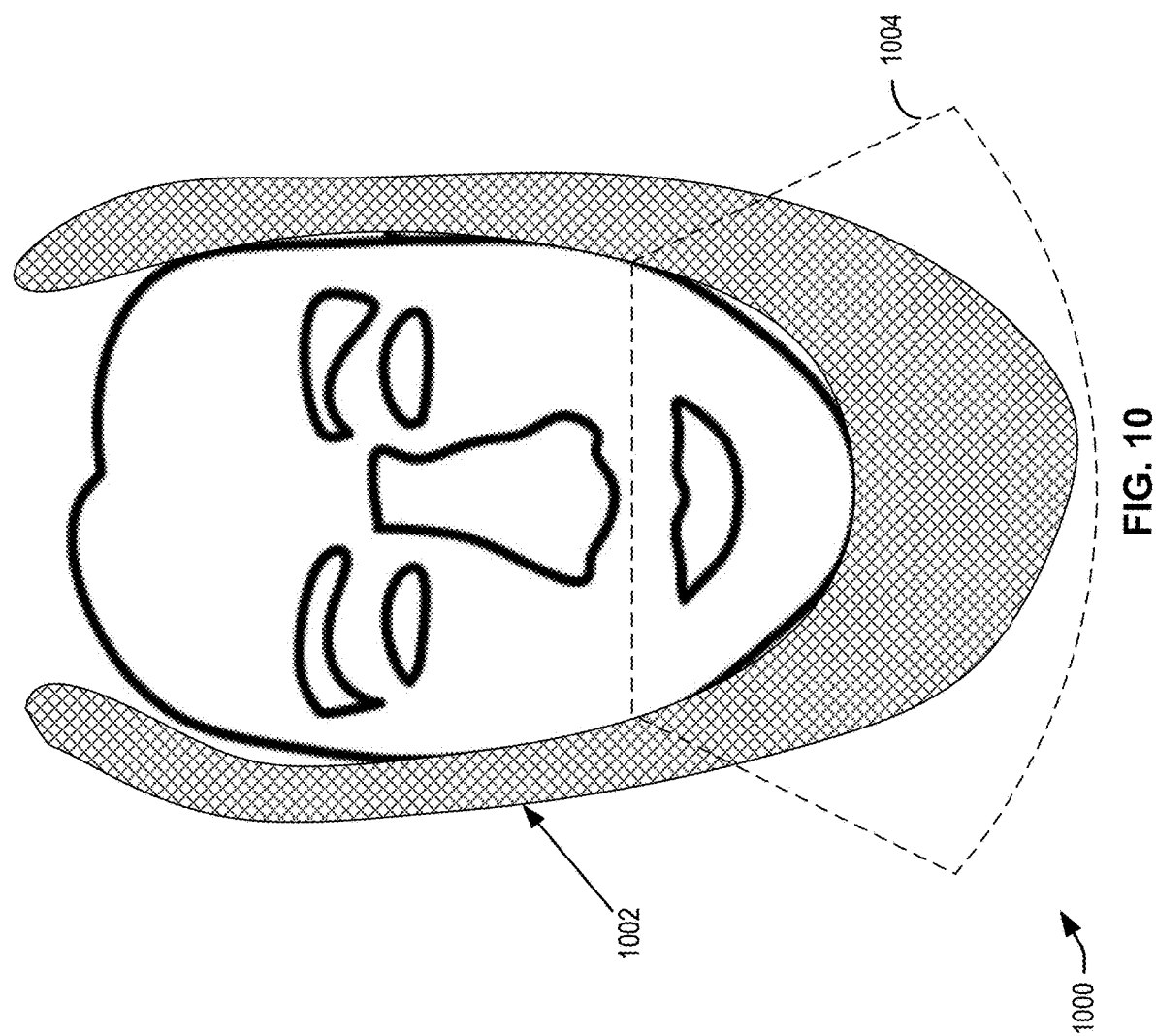
FIG. 10 is a simplified schematic diagram illustrating a shadow area corresponding to a mask that can be utilized to modify an image, according to at least one embodiment.

FIG. 10 is a simplified schematic diagram 1000 illustrating a shadow area 1002 that can be utilized to modify an image, according to at least one embodiment. The shadow area 1002 may be associated with a particular lighting mode (e.g., contour, studio, stage, black and white stage, etc.). The location and shape of the shadow area 1002 may be predefined or the location and shape of the shadow area 1002 may be determined based at least in part on a tilt, rotation, or orientation of the subject. In some embodiments, the shadow area 1002 may be defined based at least in part on one or more masks discussed herein, or the shadow area 1002 may be defined based at least in part on a set of landmark points and an implied geometry of the set of landmark points. Although particular size and shape of the shadow area 1002 is provided in FIG. 10, it should be appreciated that the attributes of the shadow area 1002 are merely illustrative in nature.

In at least one embodiment, the shadow area 1002 may be utilized to apply lighting adjustments to darken a portion of a subject. In the example depicted in FIG. 10, the shadow area 1002 may be used to darken an area outside of the facial features of the subject and extended some suitable distance down the subject's neck.

In some embodiments, image data (e.g., a set of pixels of the image corresponding to the shadow area 1002) may be adjusted universally, or the image data may be variably adjusted based at least in part on a predefined scheme associated with the shadow area 1002. For example, a set of pixels of the image data corresponding to the shadow area 1002 may each be darkened by a suitable amount by subtracted a common value (e.g., 10, 20, etc.) from respective brightness values of each of the pixels. As another example, the predefined scheme may specify that pixels corresponding to an area 1004 of the shadow area 1002 may be darkened to a greater degree than pixels corresponding to the shadow area 1002 that are outside of the area 1004.

Figure 11:
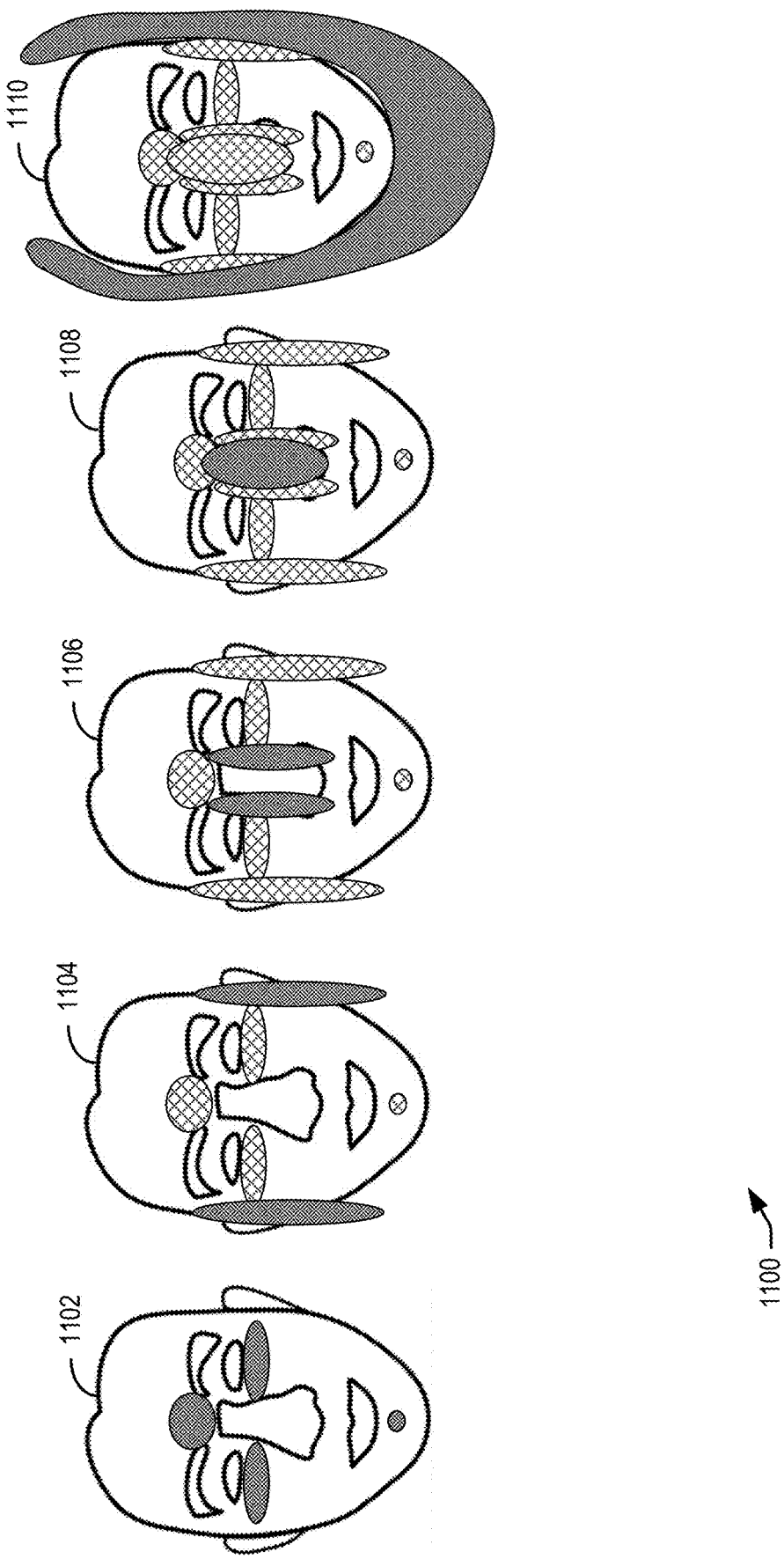
FIG. 11 is a simplified flow diagram illustrating an example process for modifying headshot image data according to a contour mode selection, according to at least one embodiment.
Figure 12:
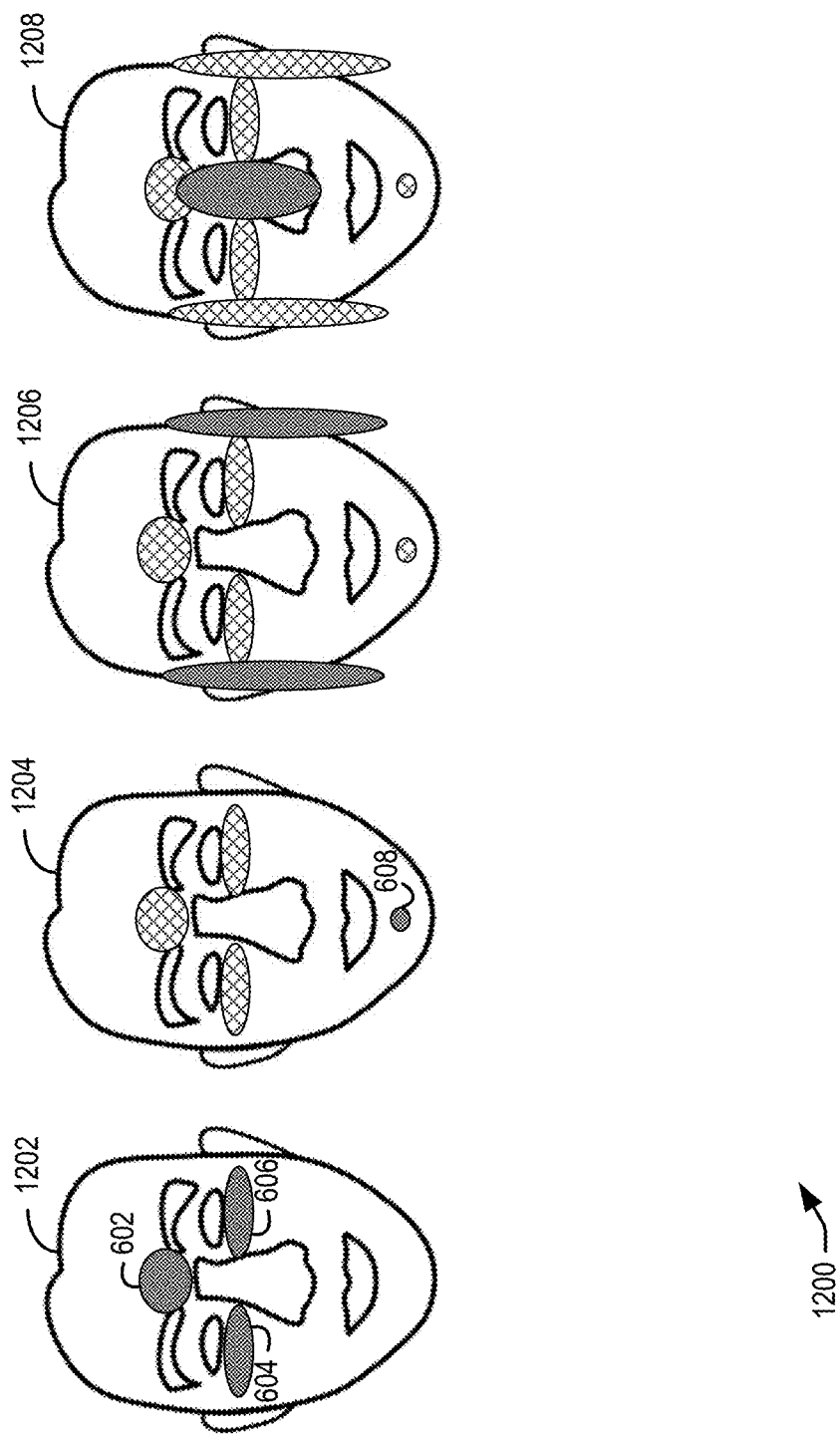
FIG. 12 is a simplified flow diagram illustrating an example process for modifying headshot image data according to a studio mode selection, according to at least one embodiment.
Figure 13:
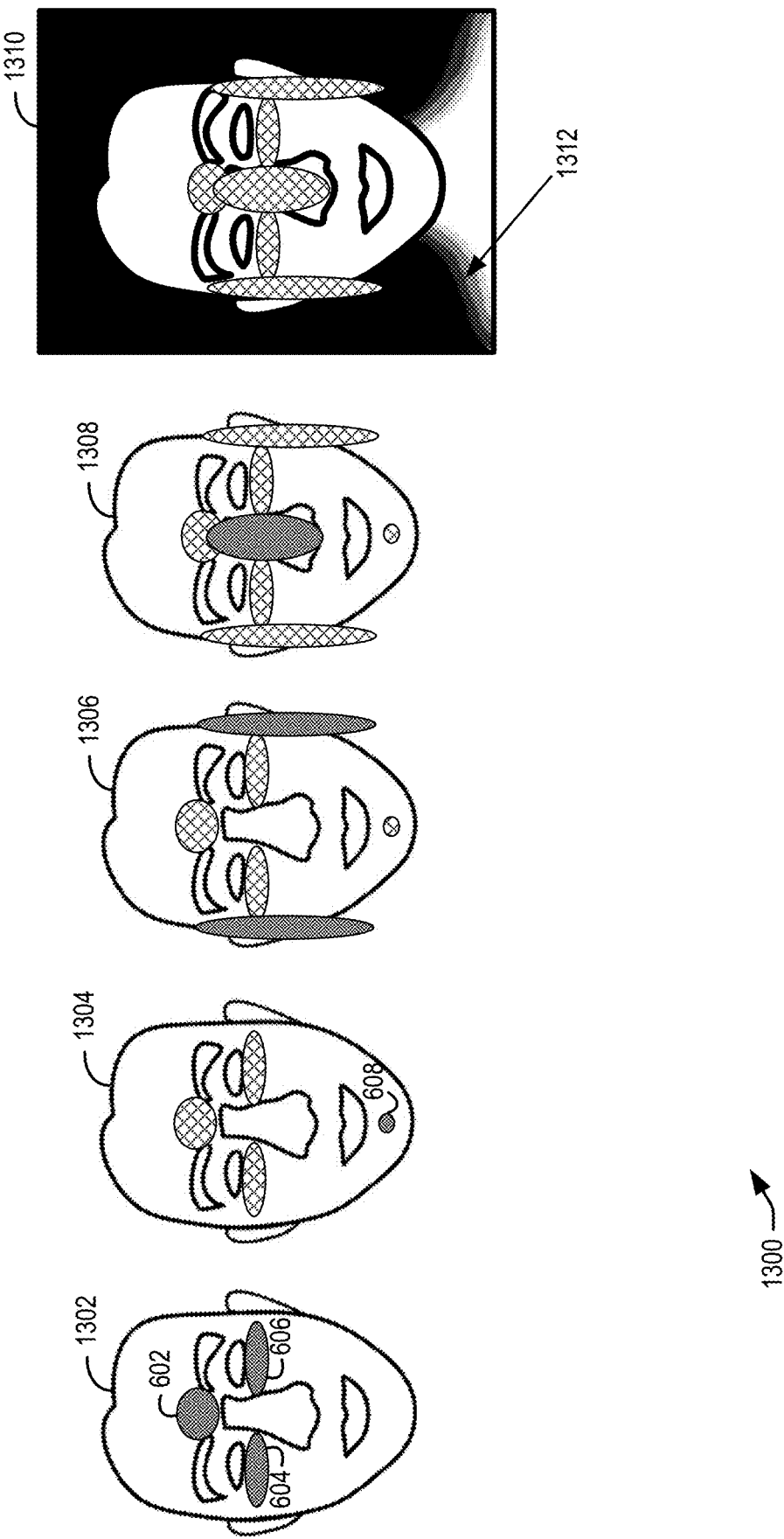
FIG. 13 is a simplified flow diagram illustrating an example process for modifying headshot image data according to a stage mode selection, according to at least one embodiment.

FIGS. 11-13 are directed to a number of examples in which the lighting adjustments are applied to image data (e.g., image data 102 of FIG. 1 corresponding to image 203 of FIG. 2). The examples of FIGS. 11-13 depict particular combinations of the lighting adjustment areas of FIGS. 5-10 and particular orders in which the adjustments corresponding to those areas may be applied. As described in the figures above, the lighting adjustment areas may be defined by one or more masks and/or various sets of landmark points and an implied geometry of the landmark points. It should be appreciated that the combinations of lighting adjustment areas and the order of the adjustments depicted are illustrative in nature and are not intended to limit the scope of the invention. The lighting adjustment areas of FIGS. 5-10 may be utilized in any suitable combination, in any suitable order. Additional lighting adjustment areas outside of those described above in FIGS. 5-10 may be utilized with, or instead of, the lighting adjustment areas of FIGS. 5-10. These additional lighting adjustment areas may be any suitable size or shape and may be directed to different pixel locations within the mask 502, the feature areas (e.g., the feature areas of FIG. 5 including the left eye-brow area 504, the right eye-brow area 506, the left eye area 508, the right eye area 510, the nose area 512, the mouth area 514, a dental area, or any suitable feature area of the mask 502), the image data, the headshot image data, or the like. As with the lighting adjustment areas of the FIGS. 5-10, the additional lighting adjustment areas may correspond to a one or more virtual lighting modes and may be associated with unique protocol sets that define how virtual lighting adjustments within the area are to be made.

FIG. 11 is a simplified flow diagram illustrating an example process 1100 for modifying image data according to a contour mode selection, according to at least one embodiment. The process 1100 may depict lighting adjustments corresponding to the contour lighting mode. The process 1100 may begin at 1102, where virtual lighting adjustments may be made to the image data according to the lighting adjustment areas of FIG. 6 according to the configuration 600.

At 1104, additional virtual lighting adjustments may be made to the image data as altered at 1102. The additional virtual lighting adjustments made at 1104 may be according to the lighting adjustment areas of FIG. 7 and the configuration 700.

At 1106, additional virtual lighting adjustments may be made to the image data as altered at 1106. The additional virtual lighting adjustments made at 1106 may be according to the lighting adjustment areas of FIG. 9 and the configuration 900.

At 1108, additional virtual lighting adjustments may be made to the image data as altered at 1106. The additional virtual lighting adjustments made at 1108 may be according to the lighting adjustment area of FIG. 8 and the configuration 800.

At 1110, additional virtual lighting adjustments corresponding to the shadow area 1002 of FIG. 10 may be made to the image data as altered at 1108.

FIG. 12 is a simplified flow diagram illustrating an example process for modifying image data according to a studio mode selection, according to at least one embodiment. The process 1200 may depict lighting adjustments corresponding to the studio lighting mode. The process 1200 may begin at 1202, where virtual lighting adjustments may be made to the image data according to some of the lighting adjustment areas of FIG. 6. For example, the lighting adjustment area 602, the lighting adjustment area 604, and the lighting adjustment area 606 may be used at 1202 to perform corresponding lighting adjustments to the image data according to a protocol set associated with the studio lighting mode At 1204, additional virtual lighting adjustments may be made to the image data as altered at 1202. By way of example, the chin area 608 of FIG. 6 may be used to perform corresponding lighting adjustments to the image data according to the protocol set associated with the studio lighting mode.

At 1206, additional virtual lighting adjustments may be made to the image data as altered at 1204. The additional virtual lighting adjustment made at 1106 may be according to the lighting adjustment areas of FIG. 7 and the configuration 700.

At 1208, additional virtual lighting adjustments may be made to the image data as altered at 1206. The additional virtual lighting adjustment made at 1208 may be according to the lighting adjustment area of FIG. 8 and the configuration 800.

FIG. 13 is a simplified flow diagram illustrating an example process 1300 for modifying image data according to a black and white stage mode selection, according to at least one embodiment. The process 1300 may depict lighting adjustments corresponding to the black and white studio lighting mode. The process 1300 may begin at 1302, where a black and white version of the image may be used to provide virtual lighting adjustments according to some of the lighting adjustment areas of FIG. 6. For example, the lighting adjustment area 602, the lighting adjustment area 604, and the lighting adjustment area 606 may be used at 1302 to perform corresponding lighting adjustments to the image data according to a protocol set associated with the studio lighting mode At 1304, additional virtual lighting adjustments may be made to the image data as altered at 1302. By way of example, the chin area 608 of FIG. 6 may be used to perform corresponding lighting adjustments to the image data according to the protocol set associated with the studio lighting mode.

At 1306, additional virtual lighting adjustments may be made to the image data as altered at 1304. The additional virtual lighting adjustment made at 1306 may be according to the lighting adjustment areas of FIG. 7 and the configuration 700.

At 1308, additional virtual lighting adjustments may be made to the image data as altered at 1306. The additional virtual lighting adjustment made at 1308 may be according to the lighting adjustment area of FIG. 8 and the configuration 800.

At 1310, additional virtual lighting adjustments may be made to the image data using the image data as altered at 1306. For example, the background of the image data (e.g., the area behind the headshot image data depicting the subject of the image) may be blackened (or darkened). Additionally, a gradient effect may be applied as depicted at 1312. The gradient effect may cause the subject of the image to be emerging from the blackened background.

Figure 14:
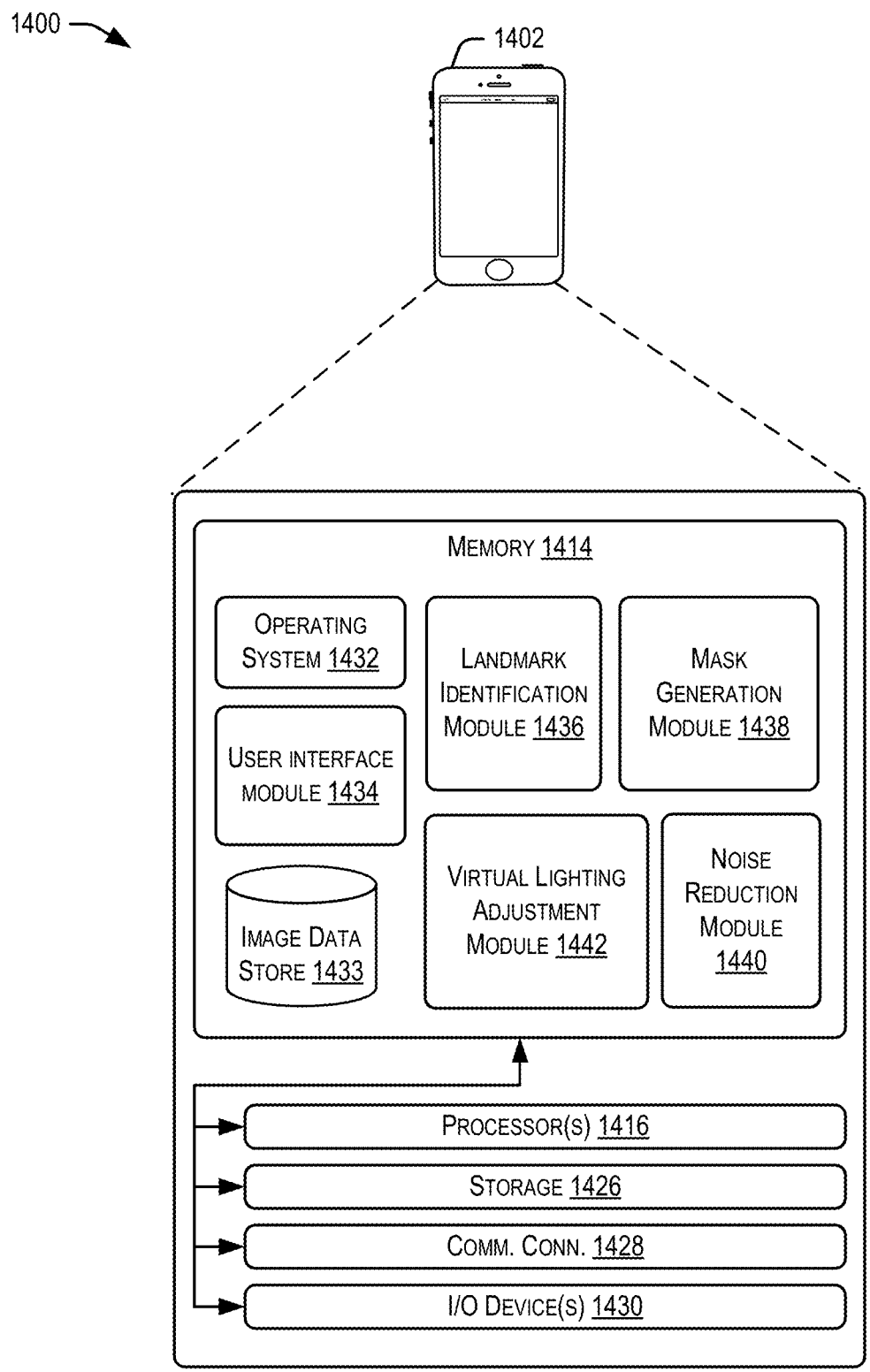
FIG. 14 schematically illustrates an example computer architecture including a plurality of modules that may perform functions described herein, in accordance with at least one embodiment.

FIG. 14 schematically illustrates an example computer architecture 1400 including a plurality of modules that may perform functions described herein, in accordance with at least one embodiment. In some examples, a computing device 1402 (e.g., a personal device such as a smartphone, wearable device, laptop, or the like) of the example architecture 1400 may be configured to present a user interface (e.g., user interfaces 200). The user interface may include any suitable number and configuration of the user interface elements above.

As noted above, the computing device 1402 may be configured to execute or otherwise manage applications or instructions for presenting a user interface (e.g., the user interface 200) and providing lighting mode adjustments to image data. The computing device 1402 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the computing device 1402 may include at least one memory 1414 and one or more processing units (or processor(s)) 1416. The processor(s) 1416 may be implemented as appropriate in hardware, computer-executable instructions, or combinations thereof. Computer-executable instruction or firmware implementations of the processor(s) 1416 may include computer-executable or machine-executable instructions written in any suitable programming language to perform the various functions described.

The memory 1414 may store program instructions that are loadable and executable on the processor(s) 1416, as well as data generated during the execution of these programs. Depending on the configuration and type of the computing device 1402, the memory 1414 may be volatile (such as random access memory (RAM)) and/or non-volatile (such as read-only memory (ROM), flash memory, etc.). The computing device 1402 may also include additional removable storage and/or non-removable storage 1426 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1414 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 1414 and the additional storage 1426, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 1414 and the additional storage 1426 are both examples of non-transitory computer storage media. Additional types of computer storage media that may be present in the computing device 1402 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the computing device 1402. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 1402 may also contain communications connection(s) 1428 that allow the computing device 1402 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The computing device 1402 may also include I/O device(s) 1430, such as a touch input device, a keyboard, a mouse, a pen, a voice input device, a display, a speaker, a printer, etc.

Turning to the contents of the memory 1414 in more detail, the memory 1414 may include an operating system 1432 and/or one or more application programs or services for implementing the features disclosed herein. The memory 1414 may include image data store 1433 which may be configured to store image data (e.g., the image data 102 of FIG. 1). The memory 1414 may include a plurality of modules for performing functions in accordance with at least one embodiment. The modules may include a user interface module 1434, a landmark identification module 1436, a mask generation module 1438, a noise reduction module 1436, and a virtual lighting adjustment module 1442. The modules may be software modules, hardware modules, or a combination thereof. If the modules are software modules, the modules can be embodied on a computer readable medium and processed by a processor in any of the computer systems described herein. It should be noted that any module, may be, in some embodiments, a service responsible for managing data of the type required to make corresponding calculations.

In some examples, the user interface module 1434 may be configured to provide the user interface 200 at the computing device 1402 (e.g., at a display of the I/O Device(s) 1430). As part of providing the user interface 200, the user interface module 1434 may be configured to retrieve image data (e.g., from image data store 1433) for presenting a digital image at the user interface 200. In some examples, the image data may include headshot image data corresponding to a headshot of a subject of the digital image. In some examples, the user interface module 1434 may present the user interface 200, or any suitable user interface for presenting and/or modifying image data. Additionally, in some examples, the user interface module 1434 may be configured to receive and/or interpret user input, user interface element selections, and/or gesture information (e.g., via a touch screen) for interacting with the user interface 200. In some embodiments, the user interface module 1434 may be configured to provide image data and/or information regarding user interface element selections to landmark identification module 1436.

In at least one embodiment, landmark identification module 1436 may be configured to obtain a set of landmark points corresponding to image data. The landmark identification module 1436 may request the set of landmark points from a source of landmark points. By way of example, the landmark identification module 1436 may request landmark points from a system or service responsible for determining a set of landmark points from image data. In some examples, the request may include the image data and a response may be returned (e.g., via the application programming interface) corresponding to a set of landmark points. The set of landmark points requested/returned may correspond to a portion of the image data (e.g., headshot image data) or the set of landmark points requested/returned may correspond to one or more particular feature areas (e.g., a nose area, an eye area, an eyebrow area, a mouth area, a dental area, or the like).

In at least one embodiment, the landmark identification module 1436 may be configured to determine a set of landmark points from the image data. Image data may be provided by the landmark identification module 1436 as input to a machine learning model. The machine learning model may be trained (e.g., utilizing supervised learning techniques) with historical figures for which a landmark points are known. Accordingly, the machine learning model may be utilized to identify a single pixel and area, where the single pixel most closely resembles corresponding landmark points of historical images.

In at least one embodiment, the mask generation module 1438 may be configured to generate a mask (e.g., the mask 502 of FIG. 5) from a set of landmark points. By way of example, the mask generation module 1438 may receive a set of landmark points obtained by the landmark identification module 1436. The set of landmark points may correspond to one or more areas (e.g., a facial area, a mouth area, a dental area, an eye area, an eyebrow area, or the like). Based at least in part on a predefined protocol set, the mask generation module 1438 may be configured to generate a mask (or a 3D model) corresponding to a facial area. In some examples, the mask generation module 1438 may exclude from the mask one or more sub-areas such as any suitable combination of an eye area, an eyebrow area, a mouth area, a dental area, or the like. As a non-limiting example, the mask may exclude two eye areas and a mouth area. In some examples, the mask generation module 1438 may generate additional masks corresponding to any suitable combination of an eye area, an eyebrow area, a mouth area, a dental area, or the like. The mask may be generated based at least in part on defining a bounded area from the set of landmark points. The mask (e.g., the 3D model) may correspond to 2D information and/or depth measurement values of the image data. Thus, in some examples, adjustments (e.g., lighting adjustments) applied to the mask may be converted and similarly applied to the image data at any suitable time.

In at least one embodiment, the noise reduction module 1440 may be configured to perform any suitable combination of noise reduction techniques utilizing the mask generated by the mask generation module 1438 and/or image data. For example, a contrast adjustment algorithm may be used to reduce local contrast of the image data within the area corresponding to the mask. In some embodiments, facial features such as freckles, birthmarks, or the like may be removed from the mask. Even if facial features are not detected, a contrast adjustment algorithm may be applied to the image to increase and/or decrease the contrast of the image. In some embodiments, the contrast adjustment algorithm may correspond to a linear filter such a Gaussian mask that comprises elements determined by a Gaussian function. In this case, the value of each pixel of the image data (e.g., corresponding to the mask) may be brought closer in harmony with the values of its neighbors. A smoothing filter may set each pixel to the average value, or a weighted average, of itself and its nearby neighbors. In some embodiments, a smoothing filter may blur an image to remove significantly higher and/or lower pixel intensity values as such values may skew an average/weighted average of the neighborhood. Other suitable noise reduction techniques may be used such as adaptive filters, non-linear filters, and/or median filters as would be apparent to one skilled in the art of noise reduction. In at least one example, the noise reduction module 1440 may be configured to store modified image data corresponding to the image after one or more noise related algorithms have been utilized to reduce or increase noise within the image.

In at least one embodiment, the virtual lighting adjustment module 1442 may be configured to receive or obtain image data. In some embodiments, the virtual lighting adjustment module 1442 may obtain the image data from the image data store 1433 and/or the noise reduction module 1440. The image data received/obtained may be original image data as captured by an image capture device (e.g., a camera) or the received/obtained image data may be image data for which one or more noise reduction algorithms have been applied. In at least one embodiment, the virtual lighting adjustment module 1442 may be configured to receive/obtain a mask for the image data (e.g., from the mask generation module 1438 or a suitable storage location configured to store masks).

The virtual lighting adjustment module 1442 may be configured to receive/obtain information corresponding to a lighting adjustment mode selected by a user. Depending on the lighting adjustment mode selected, the virtual lighting adjustment module 1442 may identify a protocol set (e.g., rules) that define a set of lighting adjustments to be made to the image data. The protocol set associated with a lighting adjustment mode may define a number (and in some cases an order) of lighting adjustments corresponding to one or more virtual lights, virtual light removal, and/or shadow areas. The protocol set may further define an amount or degree by which a luminance of a pixel is to be adjusted based at least in part on a depth measurement value. In some embodiments, pixels may be lightened or darkened based, at least in part, on a tilt/rotation/orientation of at least one of: the subject of the image, a mask, or a feature area. Specific lighting adjustments corresponding to a variety of lighting modes are discussed above with respect to FIGS. 11-13.

In some embodiments, the virtual lighting adjustment module 1442 may be configured to apply the lighting adjustments (e.g., as defined by the protocol set corresponding to the lighting adjustment mode) to image data (e.g., headshot image data), a mask, and/or a facial area. If applied to a mask, the virtual lighting adjustment module 1442 may be configured to determine corresponding pixels of the image data that correspond to points within the mask. Once determined, the virtual lighting adjustment module 1442 may cause the virtual lighting adjustments to be applied to the image data. In at least one embodiment, the virtual lighting adjustment module 1442 may be configured to provide modified image data (e.g., corresponding to the image data after the virtual lighting adjustments have been applied) via the computing device 1402. By way of example, the virtual lighting adjustment module 1442 may be configured to present the modified image data at the user interface 200 (e.g., via a display of the computing device 1402).

Figure 15:
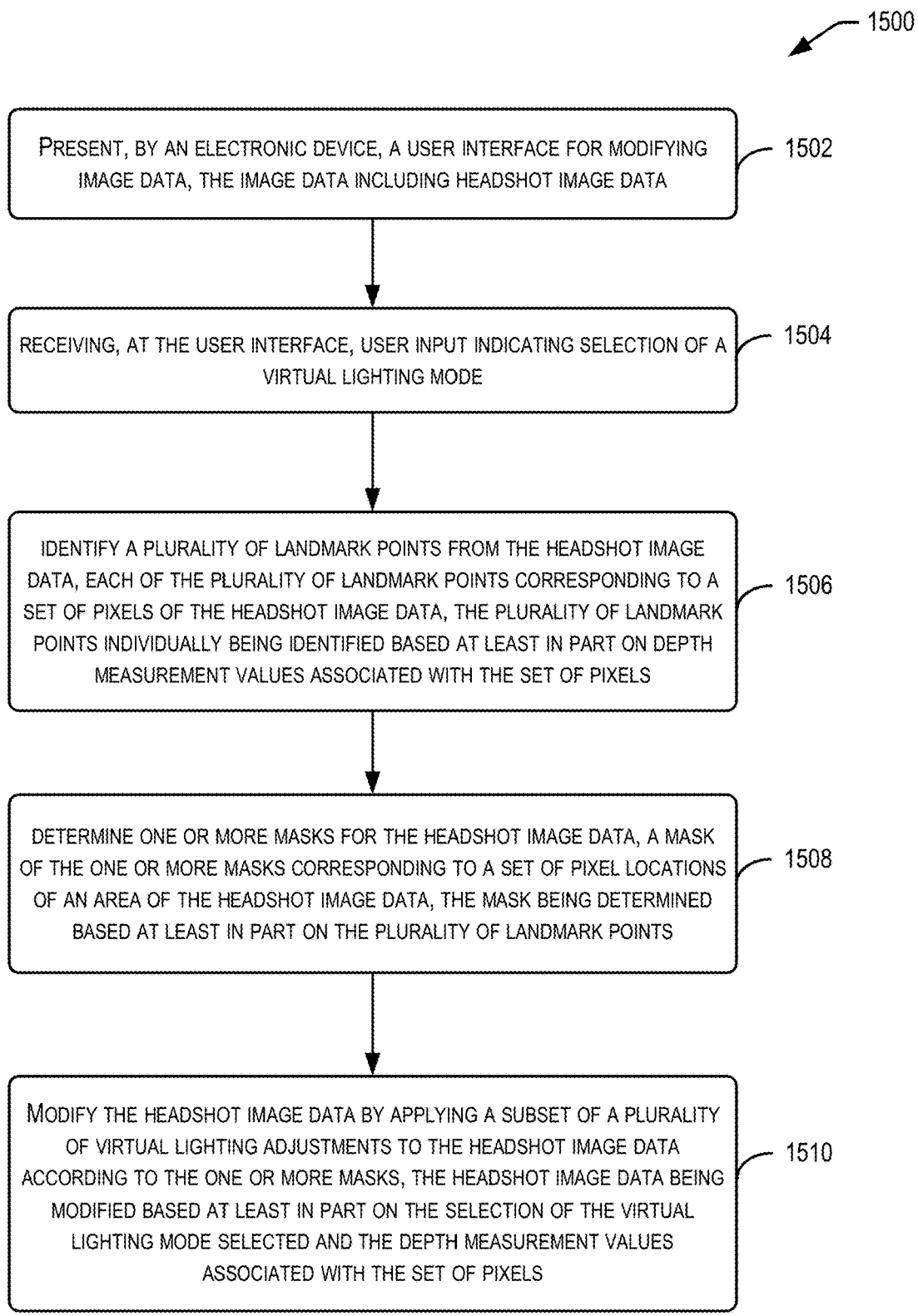
FIG. 15 is a simplified flow diagram illustrating an example process for modifying image data as described herein, according to at least one embodiment.
Figure 16:
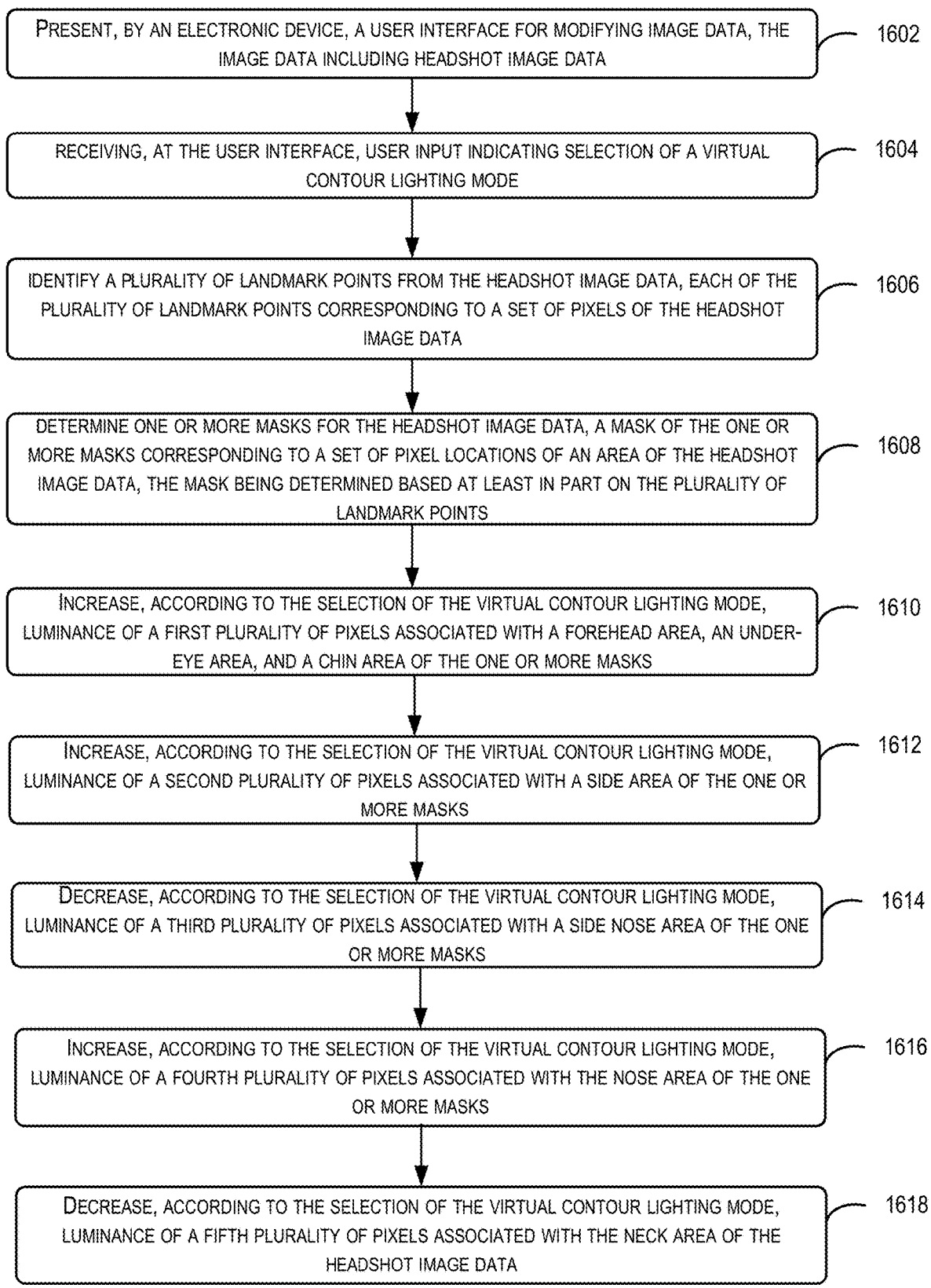
FIG. 16 is a simplified flow diagram illustrating an example process for modifying image data according to a contour mode selection as described herein, according to at least one embodiment.
Figure 17:
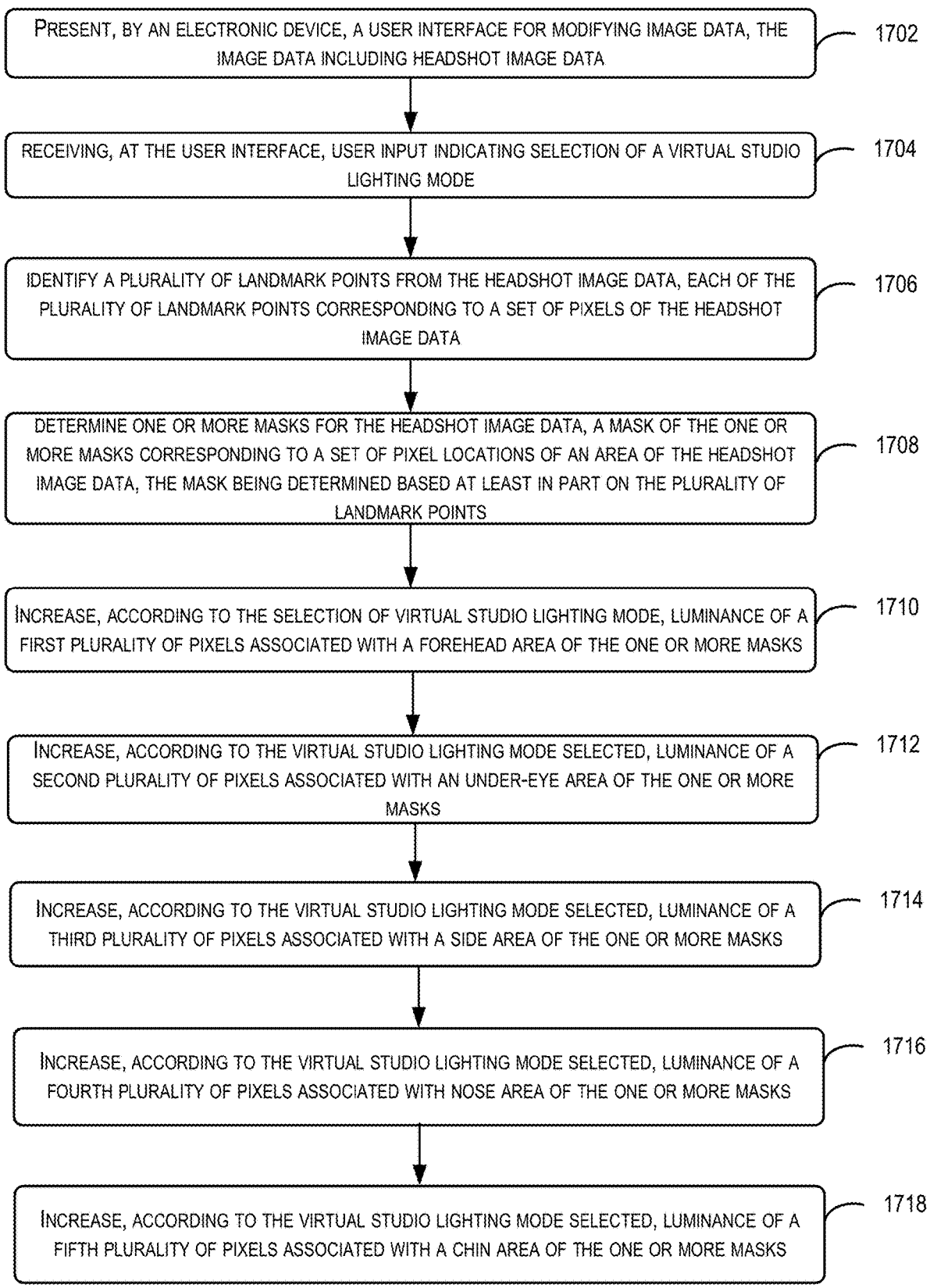
FIG. 17 is a simplified flow diagram illustrating an example process for modifying image data according to a contour mode selection as described herein, according to at least one embodiment.

FIGS. 15-17 illustrate simplified flow diagrams showing respective methods 1500, 1600, and 1700 for providing lighting mode adjustments to image data as described herein. These methods 1500, 1600, and 1700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 15 is a simplified flow diagram illustrating an example method 1500 for modifying image data according to a virtual lighting mode, according to at least one embodiment. In some examples, the method 1500 may be performed by the computing device 1402 of FIG. 14. The method 1500 may begin at 1502 where a user interface for modifying image data may be presented by an electronic device (e.g., the computing device 1402 utilizing the user interface module 1434 of FIG. 14). In some embodiments, the image data including headshot image data. By way of example, the user interface 200 may be presented on the computing device 1402 (e.g., via a display of the computing device 1402) to enable a user to modify the image data 102 of FIG. 1 (e.g., corresponding to the image 203 of FIG. 2).

At 1504, user input may be received at the user interface (e.g., the user interface 200). In some embodiments, the user input may indicate a selection of a virtual lighting mode (e.g., a contour mode, a studio mode, a stage mode, a black and white stage mode, etc.).

At 1506, a plurality of landmark points may be identified (e.g., by the landmark identification module 1436 of FIG. 14) from the headshot image data. In some embodiments, each of the plurality of landmark points may correspond to a set of pixels of the headshot image data. The plurality of landmark points may individually be identified based at least in part on depth measurement values associated with the set of pixels.

At 1508, one or more masks (e.g., any of the masks discussed herein) may be determined (e.g., by the mask generation module 1438) for the headshot image data. In some embodiments, the mask may correspond to a set of pixel locations of an area of the headshot image data. The mask may be determined (generated) based at least in part on the plurality of landmark points. In some embodiments, areas of the headshot image data may be determined based on the plurality of landmark points and an implied geometry of the plurality of landmark points.

At 1510, the headshot image data may be modified (e.g., by the virtual lighting adjustment module 1442 of FIG. 14) by applying a subset of a plurality of virtual lighting adjustments to the headshot image data according to the one or more mask(s). By way of example, the virtual lighting adjustments may be applied to a mask (e.g., a 3D model) and corresponding pixels of the headshot image data may be adjusted according to the modified mask. In some embodiments, the headshot image data may be modified (e.g., by the virtual lighting adjustment module 1442 of FIG. 14) by applying a subset of a plurality of virtual lighting adjustments to the headshot image data according to a set of landmark points and an implied geometry of the set of landmark points. In some embodiments, the headshot image data may be modified based at least in part on the selection of the virtual lighting mode selected and the depth measurement values associated with the set of pixels. In other words, the depth measurement values of the set of pixels (e.g., corresponding to an area of a mask or a set of landmark points) may influence an amount by which luminance is adjusted for the set of pixels. Pixels having a deeper depth may be adjusted less significantly than pixels that have a more shallow depth.

FIG. 16 is a simplified flow diagram illustrating an example process 1600 for modifying image data according to a virtual contour lighting mode selection as described herein, according to at least one embodiment. In some examples, the process 1600 may be performed by the computing device 1402 of FIG. 14. The process 1600 may begin at 1602 where a user interface for modifying image data may be presented by an electronic device (e.g., the computing device 1402 utilizing the user interface module 1434 of FIG. 14). In some embodiments, the image data including headshot image data. By way of example, the user interface 200 may be presented on the computing device 1402 (e.g., via a display of the computing device 1402) to enable a user to modify the image data 102 of FIG. 1 (e.g., corresponding to the image 203 of FIG. 2).

At 1604, user input may be received at the user interface (e.g., the user interface 200). In some embodiments, the user input may indicate a selection of a virtual contour lighting mode. The virtual contour lighting mode may be associated with a protocol set that defines how virtual lighting adjustments are to be made. The protocol set may define locations, areas, and/or amounts/percentages by which luminance increases/decreases are to be made with image data (including headshot image data) and/or a mask.

At 1606, a plurality of landmark points may be identified (e.g., by the landmark identification module 1436 of FIG. 14) from the headshot image data. In some embodiments, each of the plurality of landmark points may correspond to a set of pixels of the headshot image data. The plurality of landmark points may individually be identified based at least in part on depth measurement values associated with the set of pixels.

At 1608, a mask (e.g., one or more masks of the above figures) may be determined (e.g., by the mask generation module 1438) for the headshot image data. In some embodiments, the mask may correspond to a set of pixel locations of an area of the headshot image data. The mask may be determined (generated) based at least in part on the plurality of landmark points. In some embodiments, the lighting adjustments discussed with respect to FIG. 16 may utilize the one or more masks and/or one or more sets of landmark points and an implied geometry of the one or more sets of landmark points.

At 1610, luminance of a first plurality of pixels associated with a forehead area, an under-eye area, and a chin area of the mask(s) may be increased according to the selection of the virtual contour lighting mode. By way of example, the luminance may be adjusted as depicted at 1102 of FIG. 11.

At 1612, luminance of a second plurality of pixels associated with a side area of the one or more masks may be increased according to the selection of the virtual contour lighting mode. By way of example, the luminance may be adjusted as depicted at 1104 of FIG. 11.

At 1614, luminance of a third plurality of pixels associated with a side nose area of the mask may be decreased according to the selection of the virtual contour lighting mode. By way of example, the luminance may be adjusted as depicted at 1106 of FIG. 11.

At 1616, luminance of a fourth plurality of pixels associated with a side nose area of the mask may be decreased according to the selection of the virtual contour lighting mode. By way of example, the luminance may be adjusted as depicted at 1108 of FIG. 11.

At 1618, luminance of a fifth plurality of pixels associated with a neck area of the headshot image data may be decreased according to the selection of the virtual contour lighting mode. By way of example, the luminance may be adjusted as depicted at 1110 of FIG. 11.

FIG. 17 is a simplified flow diagram illustrating an example process 1700 for modifying image data according to a virtual studio mode selection as described herein, according to at least one embodiment. In some examples, the process 1700 may be performed by the computing device 1402 of FIG. 14. In some embodiments, the lighting adjustments discussed with respect to FIG. 17 may utilize the one or more masks and/or one or more sets of landmark points and an implied geometry of the one or more sets of landmark points.

The process 1700 may begin at 1702 where a user interface for modifying image data may be presented by an electronic device (e.g., the computing device 1402 utilizing the user interface module 1434 of FIG. 14). In some embodiments, the image data including headshot image data. By way of example, the user interface 200 may be presented on the computing device 1402 (e.g., via a display of the computing device 1402) to enable a user to modify the image data 102 of FIG. 1 (e.g., corresponding to the image 203 of FIG. 2).

At 1704, user input may be received at the user interface (e.g., the user interface 200). In some embodiments, the user input may indicate a selection of a virtual studio lighting mode. The virtual studio lighting mode may be associated with a protocol set that defines how virtual lighting adjustments are to be made. The protocol set may define locations, areas, and/or amounts/percentages by which luminance increases/decreases are to be made with image data (including headshot image data) and/or one or more masks.

At 1706, a plurality of landmark points may be identified (e.g., by the landmark identification module 1436 of FIG. 14) from the headshot image data. In some embodiments, each of the plurality of landmark points may correspond to a set of pixels of the headshot image data. The plurality of landmark points may individually be identified based at least in part on depth measurement values associated with the set of pixels.

At 1708, one or more masks (e.g., any of the masks described in the above figures) may be determined (e.g., by the mask generation module 1438) for the headshot image data. In some embodiments, the mask may correspond to a set of pixel locations of an area of the headshot image data. The mask(s) may be determined (generated) based at least in part on the plurality of landmark points.

At 1710, luminance of a first plurality of pixels associated with a forehead area of the one or more masks may be increased according to the selection of the virtual contour lighting mode. By way of example, the luminance may be adjusted using the lighting adjustment area 602 as depicted at 1102 of FIG. 11.

At 1712, luminance of a second plurality of pixels associated with an under-eye area of the one or more masks may be increased according to the selection of the virtual contour lighting mode. By way of example, the luminance may be adjusted using the lighting adjustment area 604 as depicted at 1202 of FIG. 12.

At 1714, luminance of a third plurality of pixels associated with a chin area of the one or more masks may be increased according to the selection of the virtual contour lighting mode. By way of example, the luminance may be adjusted using the lighting adjustment area 608 as depicted at 1204 of FIG. 12.

At 1716, luminance of a fourth plurality of pixels associated with a side area of the one or more masks may be increased according to the selection of the virtual contour lighting mode. By way of example, the luminance may be adjusted as depicted at 1206 of FIG. 12.

At 1718, luminance of a fifth plurality of pixels associated with a nose area of the headshot image data may be increased according to the selection of the virtual contour lighting mode. By way of example, the luminance may be adjusted as depicted at 1208 of FIG. 12.

What is claimed is:

1. A method, comprising:
   presenting, by an electronic device, a user interface for modifying image data defining an image, the image data including headshot image data of a subject of the image;
   receiving, at the user interface, user input indicating selection of a virtual lighting mode;
   identifying a plurality of landmark points from the headshot image data, each of the plurality of landmark points corresponding to a set of pixels of the headshot image data, the plurality of landmark points individually being identified based, at least in part, on depth measurement values associated with the set of pixels;
   generating a plurality of masks for the headshot image data, each mask corresponding to a set of pixel locations of an area of the headshot image data, and each mask being determined based, at least in part, on the locations of the plurality of landmark points; and
   modifying the headshot image data utilizing a subset of virtual lighting adjustments from a plurality of virtual lighting adjustments to areas of the headshot image data corresponding to the plurality of masks, the subset of virtual lighting adjustments utilized being modified based, at least in part, on the virtual lighting mode selected and the depth measurement values, and wherein each of the subset of virtual lighting adjustments utilizes a different mask of the plurality of masks.

2. The method of claim 1, wherein the presenting further comprises:
   capturing by an image capture device of the electronic device, the image data including the headshot image data; and
   displaying, on a display of the electronic device, a preview of the image data including the headshot image data.

3. The method of claim 1, wherein the modifying further comprising:
   displaying, on the display of the electronic device, a preview of the headshot image data as modified.

4. The method of claim 1, wherein generating a plurality of masks further comprises:
   determining, for at least one mask of the plurality of masks, at least one feature area of the headshot image data, the feature area corresponding to a plurality of pixels of the image data, the feature area corresponding to at least one of: a nose area of the subject, at least one eye area of the subject, a mouth area of the subject, a dental area of the subject, or at least one facial hair area of the subject; and
   excluding the at least one feature area from the at least one mask.

5. The method of claim 1, further comprising:
   darkening a sub-area of at least one mask of the plurality of masks utilizing a virtual light removal technique.

6. The method of claim 1, wherein the plurality of virtual lighting adjustments correspond to a plurality of virtual lights, wherein the subset of the plurality of virtual light adjustments utilize at least one of:
   a virtual spotlight that increases luminance of a first group of pixels associated with a first sub-area of at least one mask of the plurality of masks;
   a virtual strobe light that increases luminance of a second group of pixels associated with a second sub-area of at least one mask of the plurality of masks; and
   a virtual kick light that increases luminance of a third group of pixels associated with a side portion of at least one mask of the plurality of masks.

7. The method of claim 6, wherein the luminance of the first group of pixels is increased based, at least in part, comparing an area size corresponding to the first sub-area of the at least one mask to a total area of an image defined by the image data.

8. The method of claim 6, further comprising:
   identifying an orientation and a tilt of the plurality of masks based, at least in part, on the headshot image data; and
   determining dimensions of a plurality of lighting adjustment areas corresponding to sub-areas of the plurality of masks based, at least in part, on the orientation and the tilt, wherein the plurality of lighting adjustment areas are utilized to apply the subset of the plurality of virtual lights to the headshot image data utilizing the plurality of masks.

9. The method of claim 1, wherein the plurality of landmark points are further identified based, at least in part, on providing the depth measurement values associated with the set of pixels to a machine-learning model, the machine-learning model being trained on historical images in which landmark points are known.

10. A method, comprising:
presenting, by an electronic device, a user interface for modifying image data, the image data including headshot image data;
receiving, at the user interface, user input indicating selection of a virtual contour lighting mode;
identifying a plurality of landmark points from the headshot image data, each of the plurality of landmark points corresponding to a set of pixels of the headshot image data, the plurality of landmark points individually being identified based, at least in part, on depth measurement values associated with the set of pixels;
determining a plurality of masks for the headshot image data, the plurality of masks each corresponding to a set of pixel locations of different areas of the headshot image data, the plurality of masks each being determined based, at least in part, on the plurality of landmark points and the depth measurement values;
increasing, according to the selection of the virtual contour lighting mode, luminance of a first plurality of pixels associated with a forehead area, an under-eye area, and a chin area identified by a first mask;
decreasing, according to the selection of the virtual contour lighting mode, luminance of a second plurality of pixels associated with a side area identified by a second mask;
increasing, according to the selection of the virtual contour lighting mode, luminance of a third plurality of pixels associated with a side nose area identified by a third mask;
increasing, according to the selection of the virtual contour lighting mode, luminescence of a fourth plurality of pixels associated with a nose area identified by a fourth mask; and
decreasing, according to the selection of the virtual contour lighting mode, luminance of a fifth plurality of pixels associated with a neck area of the headshot image data, the neck area being identified based, at least in part, on a relation to a fifth mask of the plurality of masks.

11. The method of claim 10, further comprising:
modifying the headshot image data by executing at least one contrast reduction algorithm, wherein executing the contrast reduction algorithm causes image noise to be reduced with the headshot image data.

12. The method of claim 11, wherein the at least one contrast reduction algorithm comprises at least one of: a Gaussian mask, a smoothing filter, a linear filter, a non-linear filter, or a median filter.

13. The method of claim 10, wherein the neck area of the headshot image data is defined in relation to the plurality of masks.

14. The method of claim 10, wherein at least one of the plurality of masks is further determined by:
identifying two eye-areas of the at least one mask and a mouth area of the at least one mask; and
excluding the two eye-areas and the mouth area from the at least one mask.

15. A method, comprising:
presenting, by an electronic device, a user interface for modifying image data, the image data including headshot image data;
receiving, at the user interface, user input indicating selection of a virtual studio lighting mode;
identifying a plurality of landmark points from the headshot image data, each of the plurality of landmark points corresponding to a set of pixels of the headshot image data, the plurality of landmark points individually being identified based, at least in part, on depth measurement values associated with the set of pixels;
determining a plurality of masks for the headshot image data, the plurality of masks each corresponding to a set of pixel locations of differing areas of the headshot image data, the plurality of masks being determined based, at least in part, on the plurality of landmark points and the depth measurement values;
increasing, according to the virtual studio lighting mode selected, luminance of a first plurality of pixels associated with a forehead area identified by a first mask;
increasing, according to the virtual studio lighting mode selected, luminance of a second plurality of pixels associated with an under-eye area identified by a second mask;
increasing, according to the virtual studio lighting mode selected, luminance of a third plurality of pixels associated with a chin area identified by a third mask;
increasing, according to the virtual studio lighting mode selected, luminance of a fourth plurality of pixels associated with a side area identified by a fourth mask; and
increasing, according to the virtual studio lighting mode selected, luminance of a fifth plurality of pixels associated with nose area identified by a fifth mask.

16. The method of claim 15, further comprising:
determining a plurality of masks for each of a plurality of subjects of the image data, each of the plurality of masks corresponding to sets of pixels associated with a respective one of the plurality of subjects of the image data, wherein each of the plurality of masks for each of the plurality of subjects are determined based, at least in part, on a respective plurality of landmark points identified for a respective subject of the image data; and
increasing, according to the selection of the virtual studio lighting mode, luminance of the sets of pixels according to a predefined scheme associated with the virtual studio lighting mode selected.

17. The method of claim 15, further comprising:
filtering noise of the headshot image data utilizing a local contrast reduction algorithm.

18. The method of claim 15, wherein an amount by which the luminance is increased is based, at least in part, on first depth measurement values of a first set of pixels of a first area of the mask relative to second depth measurement values of a second set of pixels of a second area of a total image defined by the image data.

19. The method of claim 15, wherein an amount by which the luminance is increased is based, at least in part, on a tilt of a subject of headshot image data.

20. The method of claim 15, wherein the luminance is increased for the first plurality of pixels, the second plurality of pixels, the third plurality of pixels, the fourth plurality of pixels and the fifth plurality of pixels utilizing corresponding lighting adjustment areas, the corresponding light adjustment areas defining a boundary within which adjustments in luminance are made.

21. The method of claim 20, wherein widths of the corresponding lighting adjustment areas are based, at least in part, on an orientation of the mask.

22. A non-transitory computer-readable media comprising instructions, the instructions comprising instructions, which, when executed by one or more processors, cause the one or more processors to:

present, by an electronic device, a user interface for modifying image data defining an image, the image data including headshot image data of a subject of the image;
receive, at the user interface, user input indicating selection of a virtual lighting mode;
identify a plurality of landmark points from the headshot image data, each of the plurality of landmark points corresponding to a set of pixels of the headshot image data, the plurality of landmark points individually being identified based at least in part on depth measurement values associated with the set of pixels;
generate a plurality of masks for the headshot image data, each mask corresponding to a set of pixel locations of an area of the headshot image data, and each mask being determined based at least in part on the locations of the plurality of landmark points; and
modify the headshot image data utilizing a subset of virtual lighting adjustments from a plurality of virtual lighting adjustments to areas of the headshot image data corresponding to the plurality of masks, the subset of virtual lighting adjustments utilized being modified based, at least in part, on the virtual lighting mode selected and the depth measurement values, and wherein each of the subset of virtual lighting adjustments utilizes a different mask of the plurality of masks.

23. The non-transitory computer-readable media of claim 22, wherein the plurality of landmark points are further identified based, at least in part, on providing the depth measurement values associated with the set of pixels to a machine-learning model, the machine-learning model being trained on historical images in which landmark points are known.

24. An electronic device, comprising:
a display;
an image capture device;
a one or more processors;
a memory comprising instructions, which, when executed by the one or more processors, cause the one or more processors to:
present a user interface on the display of the electronic device for modifying image data defining an image captured by the image capture device, the image data including headshot image data of a subject of the image;
receive, at the user interface, user input indicating selection of a virtual lighting mode;
identify a plurality of landmark points from the headshot image data, each of the plurality of landmark points corresponding to a set of pixels of the headshot image data, the plurality of landmark points individually being identified based at least in part on depth measurement values associated with the set of pixels;
generate a plurality of masks for the headshot image data, each mask corresponding to a set of pixel locations of an area of the headshot image data, and each mask being determined based at least in part on the locations of the plurality of landmark points; and
modify the headshot image data utilizing a subset of virtual lighting adjustments from a plurality of virtual lighting adjustments to areas of the headshot image data corresponding to the plurality of masks, the subset of virtual lighting adjustments utilized being modified based, at least in part, on the virtual lighting mode selected and the depth measurement values, and wherein each of the subset of virtual lighting adjustments utilizes a different mask of the plurality of masks.

25. The electronic device of claim 24, wherein the plurality of landmark points are further identified based, at least in part, on providing the depth measurement values associated with the set of pixels to a machine-learning model, the machine-learning model being trained on historical images in which landmark points are known.

* * * * *